(12) United States Patent
Sieracki

(10) Patent No.: US 7,079,986 B2
(45) Date of Patent: Jul. 18, 2006

(54) GREEDY ADAPTIVE SIGNATURE DISCRIMINATION SYSTEM AND METHOD

(76) Inventor: Jeffrey M. Sieracki, 13506 Collingwood Ter., Silver Spring, MD (US) 20904

( * ) Notice: Subject to any disclaimer, the term of this patent is extended or adjusted under 35 U.S.C. 154(b) by 0 days.

(21) Appl. No.: 10/748,182

(22) Filed: Dec. 31, 2003

(65) Prior Publication Data

US 2005/0149296 A1 Jul. 7, 2005

(51) Int. Cl.
*H03F 1/26* (2006.01)
*G01R 29/26* (2006.01)

(52) U.S. Cl. .......................... 702/189; 702/69; 702/74
(58) Field of Classification Search ................ 702/69, 702/74, 81, 182, 189, 190, 191, 198; 710/15, 710/16, 260, 26; 713/1, 176, 180
See application file for complete search history.

(56) References Cited

U.S. PATENT DOCUMENTS

| | | | |
|---|---|---|---|
| 5,502,764 A * | 3/1996 | Naccache | 713/180 |
| 5,699,121 A | 12/1997 | Zakhor et al. | |
| 5,764,921 A | 6/1998 | Banham et al. | |
| 6,016,546 A * | 1/2000 | Kephart et al. | 713/200 |
| 6,587,507 B1 | 7/2003 | Chui et al. | |
| 2001/0028683 A1 | 10/2001 | Bottreau et al. | |
| 2002/0159518 A1 | 10/2002 | Bottreau et al. | |
| 2003/0009332 A1 | 1/2003 | Heusdens et al. | |
| 2003/0058943 A1 | 3/2003 | Zakhor et al. | |
| 2003/0103563 A1 | 6/2003 | Amini et al. | |
| 2003/0108101 A1 | 6/2003 | Frossard et al. | |
| 2003/0165331 A1 | 9/2003 | Van Der Schaar | |
| 2003/0179825 A1 | 9/2003 | Sekiguchi et al. | |
| 2005/0015600 A1 * | 1/2005 | Miyazaki et al. | 713/176 |

OTHER PUBLICATIONS

Mallat, S.G. and Zhang, Zhifang, "Matching Pursuits with Time-Frequency Dictionaries," IEEE Transactions on Signal Processing, 41(1993)3397-3415.

Bergeaud, F. and Mallat, S., "Matching Pursuit of Images," name of publication unknown, published by Academic Press, Inc. 1995.

Davis, G. and Mallat, S. "Adaptive Greedy Approximations," Contract Research Report sustantially identical to doctoral dissertation of Geoffrey Davis, New York University Graduate School of Arts and Science, 1994.

Leviatan, D. and Temlyakov, V.N., "Simultaneous Approximation By Greedy Algorithms," Report, funded by National Science Foundation Grant DMS 0200187 and Office of Naval Research Grant N00014-96-1-1003; not known whether this report was ever publsihed; possibly "made available" as a preprint sometime during 2003.

* cited by examiner

*Primary Examiner*—Bryan Bui
(74) *Attorney, Agent, or Firm*—Burns & Levinson LLP; Frederick C. Williams

(57) ABSTRACT

A system and method for determining from an arbitrary signal a characteristic signature or other characterizing feature and for distinguishing signals associated with one specific condition from those associated with one or more other conditions. The system uses dictionaries of plural sets of basis signal elements, for example, combinations of orthogonal bases with different characteristics. It optimizes the fit of part of an arbitrary signal to one or more elements of one class of basis signals from a dictionary and iteratively fits the remainder of the arbitrary signal to elements of an optimal class of basis signals, either the original or a different class depending on the goodness of match between the residual part of the signal and the subsequent basis class.

42 Claims, 7 Drawing Sheets

GREEDY ADAPTIVE SIGNATURE DISCRIMINATION SYSTEM AND METHOD

FIELD OF THE INVENTION

The current invention relates to pattern and signal recognition and discrimination, and more particularly, to analyzing differences and similarities between groups of patterns or signals. The invention also relates to identification and analysis of characteristics of interest in patterns and signals and to sorting of novel data based on discovered characteristics. Additionally, the invention relates to compact representation, compression and noise reduction of patterns and signals.

BACKGROUND OF THE INVENTION

Pattern and signal discrimination problems arise in numerous applications. If the nature of observed patterns or signals is well understood, then selection of an appropriate analysis method is straightforward. However, if the process that generates a pattern or signal is poorly understood, then discriminations and comparisons between instances of observed data are frequently ad hoc and yield weak results. In many cases, each observed patterns or signal is known to lie in one of a plurality of distinct classes but the inherent characteristics that define each class and differentiate between classes are unknown. A means to "bootstrap" and discover empirical identification of discriminating characteristics is critical.

Signature detection is one example of a target problem. A "signature" is a pattern within a signal or a data stream that can be associated with a condition of interest in the signal generating system. The goal is to discover and characterize signatures of specific conditions by examining groups of data collected under conditions with and without the signature present. By comparing the two groups of data one hopes to extract a representation of the signature.

There is a need for classifying and discriminating, for example, messy biometric signals. One specific signature detection problem targeted by the instant invention is identifying specific cognitive processes in electroencephalographic (EEG) and electro-cortical (EcoG) signals. The signals are electrical voltages measured by one or more electrodes placed either on the scalp (EEG) or on the surface of the brain itself (EcoG). (Sometimes, in fact, especially in experiments with laboratory animals, electrodes are placed interiorly in the brain.) The relationship between underlying cognitive activity and a measured signal is at best very poorly understood. Superficially, EEG/EcoG voltage patterns generally look like "colored" noise.

An empirical approach to understanding signals from the brain is to put the brain into a known condition and then sample the patterns that are correlated with that condition. In some example tasks, a subject might be asked to push a switch, to distinguish tones, to read words or to name pictures.

By analyzing the collected data, one would like to discover a signature that is indicative of the experimental condition. Ultimately, one might hope to identify signature patterns associated with very specific activities. For example, by understanding the signature brain activity preceding the act of pushing a switch, it may be possible to design a system that detects when a person merely thinks about the action. It might likewise be possible to design a system that detects the signature relating to thinking about specific words or phrases. These systems have obvious application in machine/human interfaces. There are also medical applications, including pre-seizure or mid-seizure detection of epileptic seizures, mapping brain areas prior to surgery, and so forth.

EEG and EcoG signature detection has been attempted using many techniques, including time-series averaging, Fourier and Wavelet analysis, and Matching Pursuits methods. Research is widespread and, while certain interesting foci have emerged (e.g., 40-hertz binding, alpha energy suppression, etc.), the existing methods have not yielded a satisfactory description of the underlying signature patterns. In part this is due to limitations of the methods. As will be discussed, the existing analysis methods generally rely on comparing the signals to certain standardized, mathematically "nice" prototype signals. The existing methods do not accommodate nonconforming signal dynamics very well and at best they present a blurred average picture of the situation.

Finally, in practice it may be necessary not only to distinguish the absence or presence of certain signatures (e.g., subject sees an image), but also to clearly distinguish one signature from another (e.g., subject sees a dog not a cat.) It is important to understand both what is common in similar subject signals and what is distinctive in different subject signal groups.

Another specific signature detection problem occurs in engine health monitoring. The problem in this case data is to predict failures of the engine, transmission, or other key component in a mechanical system from data that is periodically recorded. Often oil particulates, mechanical vibration levels, and other physical data are utilized. There is increasing interest in using acoustic analysis to predict failures.

It is very difficult to model mechanical interactions a priori in sufficient detail, especially if a system is exposed to unpredictable environmental factors. Here too an empirical approach is applied. One or more acoustic sensors mounted on or near the apparatus record signals. Frequencies of interest may range from subsonic to ultrasonic, depending on the monitored system. In this case the signals represent time-varying acoustic pressure patterns, i.e., sound. When components of the engine fail, the time of failure is recorded. By examining the acoustic signals prior to failure in a collection of different units or in the same unit on different occasions, one hopes to extract a universal signature signal that precedes the event. If such signatures are identified, then a system could be deployed to monitor engine health and warn users of pending failure in time to take corrective actions.

The idea of signature detection is not limited to classic signals, like sound or EEG, but is potentially applicable to latent patterns in any kind of data set. In engine health analysis, one might equally well look for signature patterns of variation in oil particulate counts prior to a mechanical failure. If oil is sampled regularly enough, then different patterns of increase or decrease in ferrous or organic contaminants might be associated with incremental failure of components. By identifying a signature in the data, a system can be developed to warn users of maintenance issues or pending failure.

Using either example measure, the engine health problem is complicated by familiar factors. The signals are not easily modeled by mathematically nice prototype patterns, existing analysis methods do not accommodate nonconforming signal dynamics very well, and the environment introduces additional unpredictable variations. Fine points again arise: it is very important to predict pending catastrophic failure, but even more useful to predict whether a particular bearing or cylinder head is the likely culprit.

Both these example problems can be broadened in various ways. An EEG signature corresponding to a particular person's brain activity might be used as a security key device. An audio signature corresponding to a particular class of mechanical engine might be used to remotely identify aircraft or naval vessels in defense applications.

Moreover, signature recognition and detection is important in other fields. Signature patterns may help computer systems recognize images or detect motion. Signature patterns in seismic data may predict earthquake and/or volcanic activity. Signature patterns in acoustic sounding returns may predict the presence or absence of minerals. Signature patterns in radar and sonar returns may be used for target identification and classification. Signature patterns in sound may be used to enhance speech recognition and machine translation. Signature patterns in DNA structures may be useful in genomic classification problems and in relating phenotype to genotype. Signature patterns in medical data may be used to diagnose disease. Many other well-known data mining or auto-classification problems share characteristic difficulties with the expanded examples, and could potentially be better addressed with a more adaptable analysis algorithm.

In general, problem data sets may arise whenever similar information is collected under two or more distinct conditions, or can by otherwise sorted into two or more distinct groups that must be compared. In typical cases, data groups are believed to be different from each other, but the characteristic differences between them are either poorly understood or completely unknown. Likewise, the data within each data group is typically expected to be similar; however the characteristic similarities may be poorly understood or may be completely unknown.

Sorted data sets naturally arise in controlled experimentation. In such cases, an experimental designer first defines two or more sets of conditions. Then, each experimental condition is manifested and information is recorded by some means. Each controlled period or situation is often termed a "trial", and an experiment consists of one or more trials under each of a plurality of conditions. The data set comprises a trial-by-trial collection of information, consisting of the observations for each trial together with some means of distinguishing the relevant conditions for each trial.

Sorted data sets also arise in less controlled situations. Data may be collected continuously or periodically in any circumstance and tagged to indicate which of a plurality of possible conditions each datum is associated with. Tagging and sorting may occur during recording, or it may occur after the fact. Sorting may be automatic, or it may require a skilled individual, and may occur by any means so long as it establishes two or more groups of trial data. Here, we apply the term "trial" to each unit of sorted data.

Finally, some problem data sets may not have any a priori divisions. In this case, data is sampled or otherwise divided into identically sized units, each unit comprising a data "vector" $\{x_1, x_2, \ldots, x_n\}$. Each data vector may be termed a trial and the goal becomes to discover structure or similarities within the collection.

The recorded data for each trial is often described as a "signal", particularly if it represents a time-varying pattern of information. However, the recorded data may be variously termed an image, pattern, vector, epoch, echo, or any other term of art that denotes an ordered set of observations. Many equivalent descriptive terms will be specific to various fields of application and obvious to those skilled in the art. For simplicity all such data will be described herein as a "signal", without limiting the invention. We will term a collection of signals a "signal data set."

Signal data sets arise in many areas and may be derived from any time- or space-varying quantity. For example: In medicine they include but are not limited to records of EEG, EKG, MEG, skin-resistance, blood pressure, heart rate, breath rate, blood chemistry, blood gas concentrations, lung volume, muscle force, any of a number of common image rendering methods, DNA sequences, infection rates, and so on. In defense engineering applications they may include but are not limited to, radar echoes, sonar echoes, passive RF, audio or optical recording, magnetic anomaly detection, etc. In communications they occur in areas including but not limited to, speech recognition, optical recognition, data compression, etc. Other signal data sets arise in areas including machine health analysis, geographic information systems, credit risk assessment, financial trends analysis, bio-informatics, seismic and mineral discovery analysis, reliability studies, scientific investigations and so on. Appropriate data sets are common; the example list is not exhaustive and many similar and related applications will be obvious to those skilled in the subject art.

When analyzing poorly understood data sets, a priori analysis methods often result in analyses with no significant statistical difference between groups and/or little or no statistical similarity within groups. Trial and error may eventually lead to discovering satisfactory discrimination criteria, or criteria may eventually be established and refined based upon improving theoretical descriptions of the data. Generally the process is laborious and chancy. Both theoretical development and empirical investigations would benefit from an analysis method that automatically adapts to the data set in order to highlight important inherent characteristics of each signal group.

The characteristics that are inherently important are those that maximize our ability to either discriminate between groups or to define similarities within groups. Statistical power is often dependent upon how the data is represented, and different theoretically equivalent data representations may tend to conceal or emphasize different characteristics.

A signal, X, is typically represented by a "vector" of coefficients, $\{x_1, x_2, \ldots x_n\}$. Such a vector may be transformed by any of a host of means, known to those skilled in the art, into another vector that is representative of the original. If no information is lost, the transformation is reversible so that the original data can be recovered; such transformations are termed "non-destructive". If information is lost, the transformation is termed "destructive"; however, such a representation may nonetheless be of use, because the characteristics that are highlighted under such a transformation are those that are concentrated into a few coefficients. In the example of a Fourier transform, the energy occurring at a particular sinusoidal frequency is concentrated in a single coefficient. Thus, strong sinusoidal patterns stand out clearly because they are represented by only a few large numbers within the new vector. In the equivalent time-series vector these same characteristics are obscured because they are distributed as small values over a large number of coefficients.

Statistical comparisons are frequently stronger, quicker and more straightforward when they are based on a few largely varying coefficients than when they are based on many minutely varying coefficients. Likewise, signal characteristics are more easily visualized when they are compactly represented.

Data transmission and storage situations suffer from similar problems. Small dynamic variations may be lost in channel noise. Concentrating important information into a few large data values allows more robust transmission. Furthermore, it is well known that such transformations can be used to compress data: after transforming data so that important information is concentrated into a few large data values, one may truncate smaller values and still recover a close approximation of the signal from the smaller data set. Moreover, under certain transforms the small, truncated coefficients will represent noise; hence, the reconstruction process may actually improve the signal to noise ratio.

In general, for any given signal data set, one would like to construct a data set-specific transform that concentrates important differences (and/or similarities) into a few coefficients. The resulting representation addresses a host of discussed needs. Moreover, if these coefficients correspond to well-understood characteristics (e.g., frequency, time, scale and others, known to those skilled in the art) then an analyst can readily interpret the results in a meaningful way. The present invention is directed toward discovering an approximately optimal representation of any signal data set based upon minimal a priori assumptions.

One object of this invention is to minimize assumptions as to the nature of similarities and differences within the data groups and automatically discover a useable set of criteria on which to discriminate. The practical aim is to find a relatively small set of coefficients and an appropriate representation form in order to compactly and robustly describe key characteristics of each signal and group of signals. Another object of the invention is representing data and classes of data in such a way that the descriptive coefficients are meaningful to the analyst, or are otherwise useful in further processing of the data. Yet a further object of the invention is representing data or classes of data compactly.

A further object of this invention is elimination of noise from a collection of data, whether the noise is only additive noise, or temporal or spatial jitter and frequency instabilities.

Yet a further object of the invention is to facilitate the identification and analysis of characteristics of interest, facilitate compact representation of patterns, signals or groups thereof, facilitate removal of noise there from, and facilitate rapid sorting of new data based on characteristics discovered in prior data. And yet a further object of the invention is to provide methods of comparing signal representations after the GAD algorithm is complete

SUMMARY OF THE INVENTION

The invention, called Greedy Adaptive Detection (GAD), elicits a discriminating representation of signals in situations where each pattern or signal is known to lie in one of a small plurality of distinct classes but where the characteristics that best define each class and best differentiate between classes are unknown. The invention also applies to cases in which class characteristics are partly understood and further analysis, classification or other processing is desired. Moreover, the invention also applies to analysis of data sets that only contain one rather than a plurality of signal classes.

The instant invention, GAD, is related to, but distinct from, the method of Matching Pursuits ("MP") originally introduced by Mallat and Zhang in 1993. In particular, the calculational machinery for implementing GAD is similar to that used in Mallat, S. G. and Zhang, Zhifang, *Matching Pursuits With Time-Frequency Dictionaries*, IEEE Transactions on Signal Processing 41(1993)3397–3415. However, Mallat-Zhang's method applies to only one data vector or unit at a time. The resultant representation is optimized for only one signal not a set of signals.

The method of Matching Pursuits, introduced by Mallat and Zhang, decomposes a signal into a linear expansion over a subset of time-frequency atoms selected adaptively from a large dictionary. Coupled with Matching Pursuits, the authors introduced a dictionary of scaled, modulated, and translated Gaussian atoms and a Cohen class time-frequency energy density representation based on the Wigner distribution. Their method compactly represents local signal structure and is well suited to analyzing non-stationary signals. However, each analysis generates a different representation space so comparisons between signals must be done by examining energy density in the time-frequency plane.

The present invention introduces extensions to Matching Pursuits that allow multiple signals to be analyzed with respect to a common, quasi-optimal representation space. Resulting decompositions can be compared directly and meaningfully by utilizing the parameters of corresponding atoms in this space. The representation is substantially more compact than representation in the time-frequency plane.

The new method is developed in both general and finite dimensional Hilbert Spaces; only some of Mallat and Zhang's results apply. A stepwise choice function is introduced to select component atoms for the quasi-optimal representation space and convergence is established for a broad class of such choice functions. Behavior under optimal and sub-optimal conditions is analyzed. Utilizing the novel representation space, methods are presented for comparing signals and groups of signals, for comparing time-correlated signals with background activity, for generating time-frequency representation of similarities and differences, and for reconstructing time-domain signals derived from such comparisons.

The method is implemented numerically and evaluated by application to a variety of synthesized data sets. Finally, the method is applied to the signature detection problem in human electrocortigraphy (ECOG) data. Groups of ECoG recordings are analyzed in order to identify characteristic activity patterns associated with simple motor tasks and results are compared with those from previous Fourier transform based studies. The new method compares well, resolving more detail where activity increases over baseline than the previous methods, and allowing time-domain reconstruction of signature activity where it was not previously possible.

In a very approximate sense the instant invention is a generalization of the Mallat-Zhang approach to collections of a plurality of signals, data sets, data units, and the like, and is therefore powerful in applications to which Mallat-Zhang would be of little help, namely characterization of a plurality of signals and differentiation of one plurality of signals from another plurality of signals.

One of the embodiments of this invention can be seen simply as a generalization of MP to allow the simultaneous treatment of multiple signals. However, it can be shown by rigorous mathematics that GAD differs significantly in behavior from MP based algorithms and in particular that the mathematical results that guarantee convergence of MP do not apply to GAD. Convergence for GAD can be shown for specific conditions must be shown by different mathematics that have been derived by the inventor; moreover, in the instant invention convergence is not a strict requirement. The successful extension of MP style analysis to simultaneous treatment of multiple signals represents a significant, novel development.

The first embodiment of the invention is the analysis algorithm. The method requires a dictionary, D, comprising a large set of prototype signals each with features and components of potential interest in the analysis. The dictionary will typically but not always include numerous overlapping orthogonal bases appropriate to whatever signal space contains our target data set. The dictionary can be understood as a plurality of sets of basis functions spanning the space of possible signals. In an extreme and unrealistic example, set forth for illustration only, the dictionary might comprise a complete set of Hermite Polynomial basis functions, plus a complete set of LaGuerre Polynomials, plus a complete set of Legendre Polynomials, and additionally a complete wavelet basis such as the Haar wavelets. However, it is not a requirement of the instant invention that the dictionary include any specific set of functions.

The representation of each signal generated by the analysis algorithms contains n coefficients. An important feature of the invention is that each subject analysis algorithm generates a directly comparable representation of each signal in the analysis set. In adaptive methods of prior art, and in particularly those based on MP, each signal analysis generates an independent representation space that is not directly comparable to any other. These systems of prior art require that the signal be either reconstructed or further processed so they are represented in a much larger space in order for signals to be compared. In particular, MP based comparisons are generally made by re-representing each signal by its density in the time-frequency plane. The time-frequency plane is a two-dimensional structure that typically contains at least $N^2$ degrees of freedom, where N is the length of a signal vector. In the preferred embodiments of the present invention the value $N^2$ will typically be at least an order of magnitude greater than the value n.

Other systems of prior art restrain the size of the signal representations at the expense of adaptability. For example, in general Fourier and wavelet analysis will represent each signal as a function of some pre-selected orthogonal basis. The representations are manageable and directly comparable, but they are not at all optimized to the signal data set at hand. Methods of prior art do exist to sub-select representation basis or frames in a post-hoc manner. The present methods are distinct from these. Moreover, the present invention represents an improvement over prior art in that the selected representation framework may include elements that are very close to each other, as measured by large inner products. Certain features of the signal set that are invisible or cumbersome to discover in basis or frame representations will be very compactly and clearly described.

The method of representing each signal in a data set by a derived set of coefficients based on the adaptive analysis algorithms herein described represents an advance over prior art and is an additional subject of the present invention.

The algorithm begins with one or more signals divided into one or more classes. At each step, each signal is compared via an inner product operation to each element of the dictionary. Subsequently, a score is assigned to each element in the dictionary, based on its weighted relationship to each and every signal in the comparison. The dictionary element that best fits according to the scoring method is selected. Typically, this score is derived from a vector norm across the stepwise set of inner products and the selected element is that with the largest norm value; however, any scoring method that results in an ordering of the dictionary elements may plausibly be applied. Once a dictionary element has been selected, its projection is subtracted from each of the signals in the comparison. The process then repeats using the updated signals until some stopping criteria is reached. At each step, the algorithm records the selected dictionary element along with this element's inner product with each of the signal residuals.

A second embodiment of the invention is an important variation on the basic method. Rather than selecting identical dictionary elements for each signal residual at each step, the initial stepwise choice is optimized for each individual signal residual by searching in some defined neighborhood for similar but better choices. This fundamental advance allows the algorithm to automatically compensate for natural variations and measurement errors in otherwise similar signals. It also allows the algorithm to be accelerated by utilizing sub-dictionaries, which are explained later. Each individually optimized dictionary element is considered equivalent for purposes of later comparison so long as it was selected at the same step.

Other variations on the basic algorithm will be apparent to those skilled in the art. These include operating on only one signal class at a time; selecting multiple dictionary elements each of which is to be applied to subsets of the signal residuals; subtracting a stepwise weighted mean from all signal residuals rather than individually fitting each one; post hoc comparisons of the selected dictionary elements to find similarities and so forth. These are contemplated within the scope of the invention; however, the summary shall concentrate on the preferred embodiments Each analysis results in a representation of each signal as a collection of coefficients determined with respect to a subset of the dictionary elements. By using a stepwise vector norm or other carefully chosen scoring method, the algorithm will select at each step the most applicable dictionary elements. In other words, it will select those prototypes that are most strongly represented in the data. At each step the choice may be strongly represented across the entire group, across some subset, or even by only one signal in the group; however, in any of these cases the derived coefficient will be inherently important in performing comparisons.

A significant feature of the present invention is that identical (or stepwise equivalent) dictionary elements are selected for each and every signal within the comparison group. Representing the signals in such a consistent manner allows future comparisons to be done using only the derived coefficients. Methods of prior art, in particular all of those based on Matching Pursuits, analyze each signal with respect to a different subset of dictionary items. This means that post hoc comparisons between signals must be made by much more cumbersome and data-intensive methods.

A third embodiment of the invention is the representation of a collection of signals in terms of a common group of matched prototype elements that is derived by finding a quasi-optimal fit across the entire signal set, and which elements may or may not be closely related or linearly independent from one another. A forth embodiment of the invention comprises a set of novel comparisons that are available in the resulting representation. Classes and sub classes of signals can be represented by their algebraic or geometric means in the derived space. By applying a threshold and keeping only those dictionary elements whose coefficients are sufficiently large or close to the mean, we are able to characterize classes. Likewise, by searching for those prototype elements with large mean class differences we can find key discriminating characteristics.

Additional novel and powerful comparisons are facilitated by the above-mentioned modification to the basic algorithm. By allowing variation within the selected stepwise elements it becomes possible to define an "average"

signal that is relatively free from systematic and measurement noise, including jitter frequency instabilities, and to make comparisons between groups and discover characteristics that are invisible to methods of prior art. Furthermore, if the dictionary is carefully chosen so that it is parameterized by meaningful quantities, then GAD affords the analyst important novel tools to aid in understanding the nature of the underlying signals.

A fifth embodiment of the invention is reconstruction of derived "average" and "difference" signals. Methods of prior art generally must sacrifice important information of one sort or another when averages or difference are taken in different representations. In part this is a function of the uncertainty principal, which generally limits simultaneous knowledge of both time and frequency information. However the representations generated by GAD operating with a reasonably chosen dictionary allow for reconstruction of a meaningful signal in the original space at any stage. This is particularly important to the problem of Signature Detection described previously, as well as to any situation in which a tangible example rather than an abstract description is desired.

A sixth embodiment of the invention derives from its application to comparisons between a signal group and a baseline. It will be apparent in the details of the method that some of the comprising algorithms of the present invention are applicable primarily to situations in which each signal has the same relationship to the underlying process. Occasions arise when it is desirable to compare such signals not only to each other, but also to an uncorrelated background noise exemplified by random samples that may bear no consistent relationship to the underlying process. By introducing a method of calculating RMS amplitude for the baseline data over the same set of dictionary elements, it is possible to find a mean coefficient for each that is directly comparable to the coefficients generated by algorithms above. This additional method makes meaningful weighted comparisons and reconstructions possible in this special case.

An additional embodiment of the present invention is the application of GAD to compression and de-noising of data. By using the above algorithms with an appropriate choice of dictionaries, it is possible to find an optimal representation of any data set so that its component signals are represented by relatively few large coefficients. The data set may then be stored or transmitted by means of its GAD coefficients plus a description of the dictionary elements they represent. By allowing stepwise variance in the GAD algorithm certain forms of jitter noise and frequency instabilities may be eliminated. By retaining only those coefficients greater than a set threshold, data may be compressed to the extent that the number of retained coefficients is less than those in the original signal. Moreover, by applying the novel averaging and differencing methods mentioned above streaming data can be further, dynamically compressed.

A further embodiment of the present invention is in noise reduction. Coefficient thresholds can be applied as mentioned in the last paragraph to eliminate noise from the reconstructed signal. Moreover, by taking parametric averages noise, including jitter noise and frequency instabilities, can be characterized and eliminated by an entirely novel method.

Yet another embodiment of the present invention is in data classification. By first applying the methods already described to one or more classes of data, criteria can be established by which to robustly differentiate signals. Novel signals can thereafter be sorted simply by examining their inner products with the relevant prototype dictionary elements. Moreover, by customizing the dictionary to include weighted combinations of relevant prototype dictionary elements derived from the GAD analysis, novel data may be analyzed in a more task specific fashion. In addition to direct applications of the present invention, any of numerous methods of prior art can also be applied to sort novel data by first reconstructing one or more signature signals using the methods described herein.

Customized dictionaries will be applicable to signal detection problems such as speech recognition, neural pattern recognition, mineral detection, target classification, and other such applications where detailed study of prototype elements is preformed and rapid, repeatable classifications are desirable.

The details of one or more embodiments of the invention are set forth in the accompanying drawings and the description below. Other features, objects, and advantages of the invention will be apparent from the description and drawings, and from the claims.

DETAILED DESCRIPTION OF THE PREFERRED EMBODIMENTS

Figure 1:
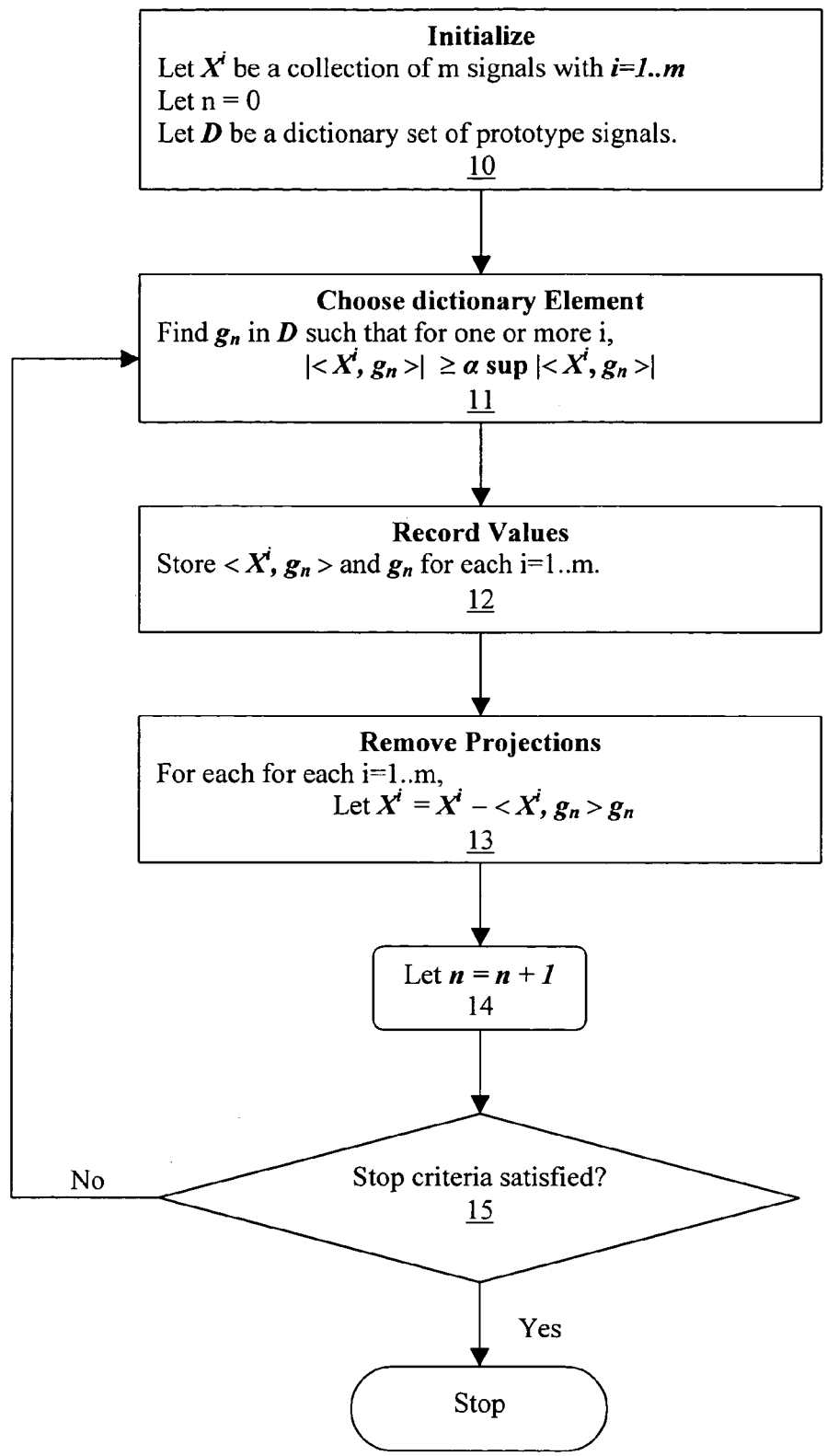
FIG. 1 is a programmatic flowchart illustrating the first and most general subject algorithm.

FIG. 1 is a programmatic flowchart depicting the analysis algorithm in its most basic form. In this embodiment, the collection of signals is represented by a set of vectors, denoted $X^i$, where i runs from 1 to m, and m is the number of signals in the collection. Each vector is an ordered collection of samples, $X^i = \{x^i_1, x^i_2, \ldots\}$. The length of the vectors is not material to the algorithm; however, typically they will be of the same length in order to facilitate natural inner product comparisons. In some embodiments, these samples will represent data values of a discrete measure; in others they may be digitized approximations of continuous analog values.

The dictionary, D, represents a large collection of prototype signals. Typically these signals will be represented in the same space as the signal vectors, $X^i$. I.e., D will contain a collection of vectors of length similar to the signal vectors. The exact nature of D is not germane to the basic algorithm description.

The initialization of these two sets of vectors occurs in block 10 of FIG. 1. In some embodiments, however, the elements of D are parameterized by one or more descriptive values and can be quickly generated or manipulated indirectly; therefore, the vectors comprising D need not always be explicitly generated prior to the next steps. Also in block 10, the step counter n is initialized to zero.

In block 11 the algorithm chooses a dictionary element from the set D. Any method of scoring possible selections may be plausible so long as the chosen element is close to optimal for at least one of the vectors X.sup.i. By optimal, we mean that the magnitude of the inner product of some X.sup.i with the selected dictionary element g.sub.n is close to the maximum possible value of all possible elements of D. To quantify what is meant by "close", we define a value called .alpha. that is larger than zero and less than or equal to one and write the equation shown in block 11. .alpha. may be fixed, or may change with n or i. Certain highly technical mathematical aspects of the scoring and choice methods will guarantee convergence of the algorithm, these are discussed by the inventor in Sieracki, J. M., "Greedy Adaptive Discrimination signal component analysis by simultaneous matching pursuits with application to EcoG signature detection," University of Maryland Doctoral Dissertation, United States Copyright Office deposit date Jun. 10, 2003, registration date Jun. 13, 2003 [hereinafter cited as "Dissertation"], incorporated by reference herein as though set forth in full. From a practical perspective, however, convergence is not always necessary for the algorithm to be useful.

In block 12 the values of the inner product of $g_n$ with each of the vectors $X^i$ are stored for later retrieval. Some representation of $g_n$ will also be stored; this may be the entire vector, or, to save space, only some index or parameter that represents and uniquely describes $g_n$ may be stored. Storage of these values facilitates future use of the results of the analysis; however, storage is not strictly required at any step for the algorithm to otherwise proceed.

In block 13 the vectors $X^i$ are updated by subtracting from each one its corresponding projection on the selected element $g_n$. As mentioned previously, many variations on this update step are obviously plausible; however, only a few will be detailed in the preferred embodiments.

In block 14, the step counter n is incremented, and in block 15 a decision is made as to whether the stop criteria have been satisfied. Reasonable stop criteria may include exceeding some number of steps n, reducing the magnitude of the largest or smallest vector $X^i$ below some threshold, reducing some weighted function of the magnitudes of $X^i$ below some threshold, and so forth. Reasonable stop criteria may also be based upon magnitudes of one more of the stepwise inner products. Many other measures will behave appropriately and additional variations in stopping criteria will be evident to those skilled in the art. The exact nature of the stopping criteria is not a critical component of the invention.

Figure 2:
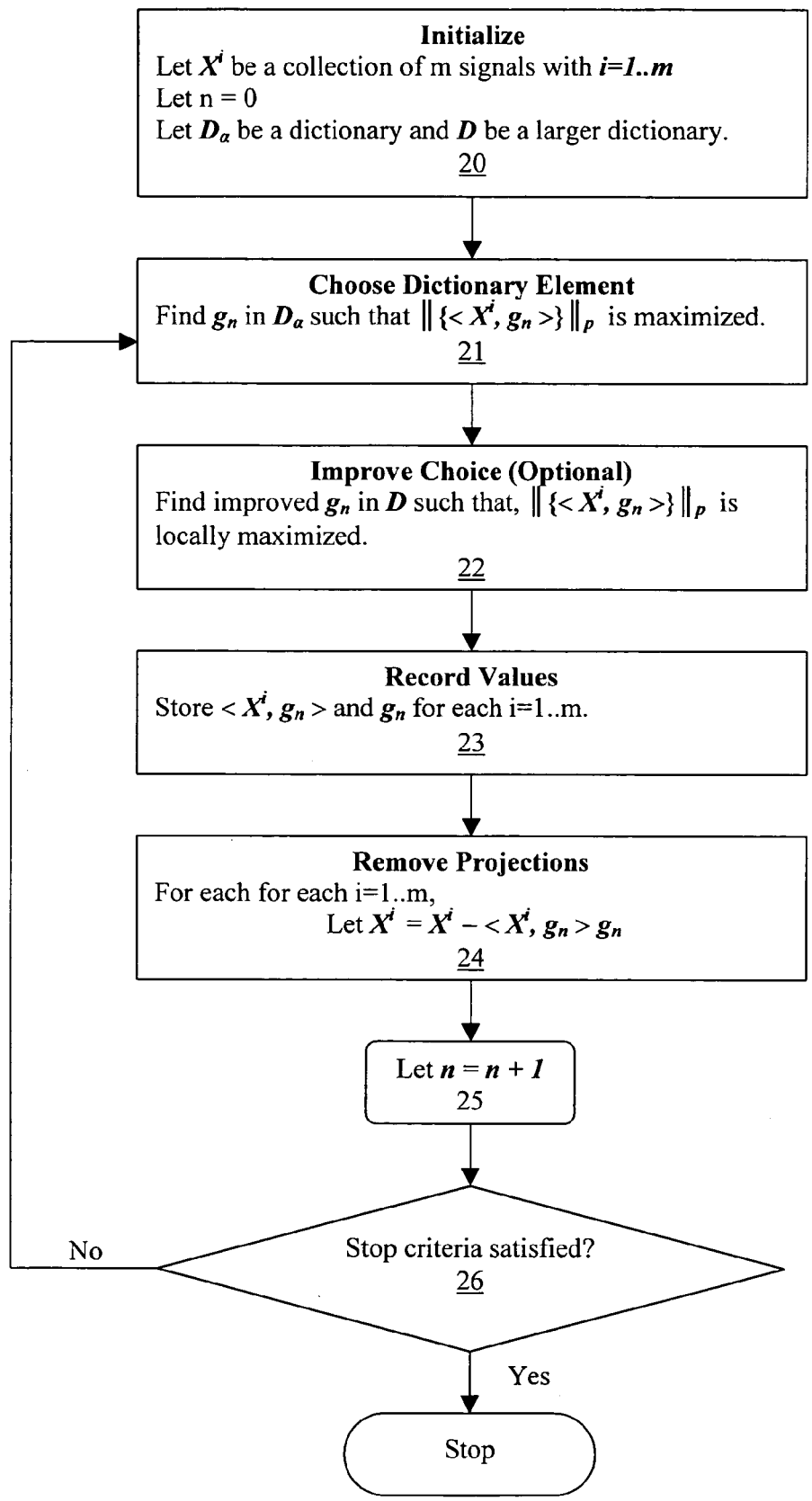
FIG. 2 is a programmatic flowchart illustrating the subject analysis algorithm using a specific scoring and choice method.

The basic algorithm depicted in FIG. 1 is summarized using standard mathematical notations that can be easily translated by a skilled programmer into machine-readable computer instructions in numerous equivalent forms. FIG. 2 is a programmatic flowchart depicting the analysis algorithm using a specific scoring and choice method (block 21) that is an additional subject of the present invention. The algorithm begins as before with initialization in block 20. Two dictionaries D and $D_a$ are defined. Generally speaking $D_a$ will be a subset of a larger dictionary D. The specifics of this will be discussed later; however, the primary motivation for introducing $D_a$ is so that the scoring and selection process of block 21 can proceed rapidly on a smaller subset $D_a$ that is representative of the larger set D. In some embodiments, $D_a$ may offer sufficient choices and no larger set D will be needed. This is reflected in the notion that block 22 is optional.

The expression $\|\{<X^i, g_n>\}\|_p$ appearing in block 21 is an operation described by the inventor in his dissertation and is defined as follows. The angular brackets $<,>$ represent a standard inner product notation well understood in digital signal processing. The curly brackets $\{\ \}$ represent a set of inner products taken at a given step n with each of the vectors $X^i$, for i=1 . . . m. Thus the set in curly brackets has m elements. The p-norm denoted $\|.\|_p$ represents a standard vector p-norm over the set of values. This is a scalar value that can be calculated for a vector x as $(\Sigma |x_i|^p)^{1/p}$, where p is a positive integer from 1 to infinity. Other vector norms may also be used.

There are other plausible sorting and selection methods within the scope of the invention; however, the inventor has shown mathematically in Dissertation that use of this particular evaluation method has several nice properties that are a subject of this invention. One important property is that the algorithm of FIG. 2 is guaranteed to converge. The stepwise choice function thus defined represents an additional unobvious and novel advance to the state of the art.

In block 22 the choice $g_n$ is improved by using this value as a starting point and searching in the larger set D in a neighborhood around $g_n$ for some even better dictionary element. Numerous well-known methods of searching a set D for a local maximum value of the scoring function $\|\{<X^i, g_n>\}\|_p$ will be apparent to those skilled in the art. The method will depend on whether D is a finite set or a parameterized infinite set. In some embodiments a so-called Newton method is used; however, the particular method of search is not critical to the larger algorithm so long as the result is no worse than that achieved by block 21. Indeed, the entire block 22 may be considered optional.

Blocks 23, 24, 25 and 26 proceed similarly to blocks 12, 13, 14 and 15 (respectively) of the algorithm of FIG. 1. Again, a skilled programmer can easily translated the algorithm depicted in FIG. 2 into machine-readable instructions in numerous equivalent forms.

Figure 3:
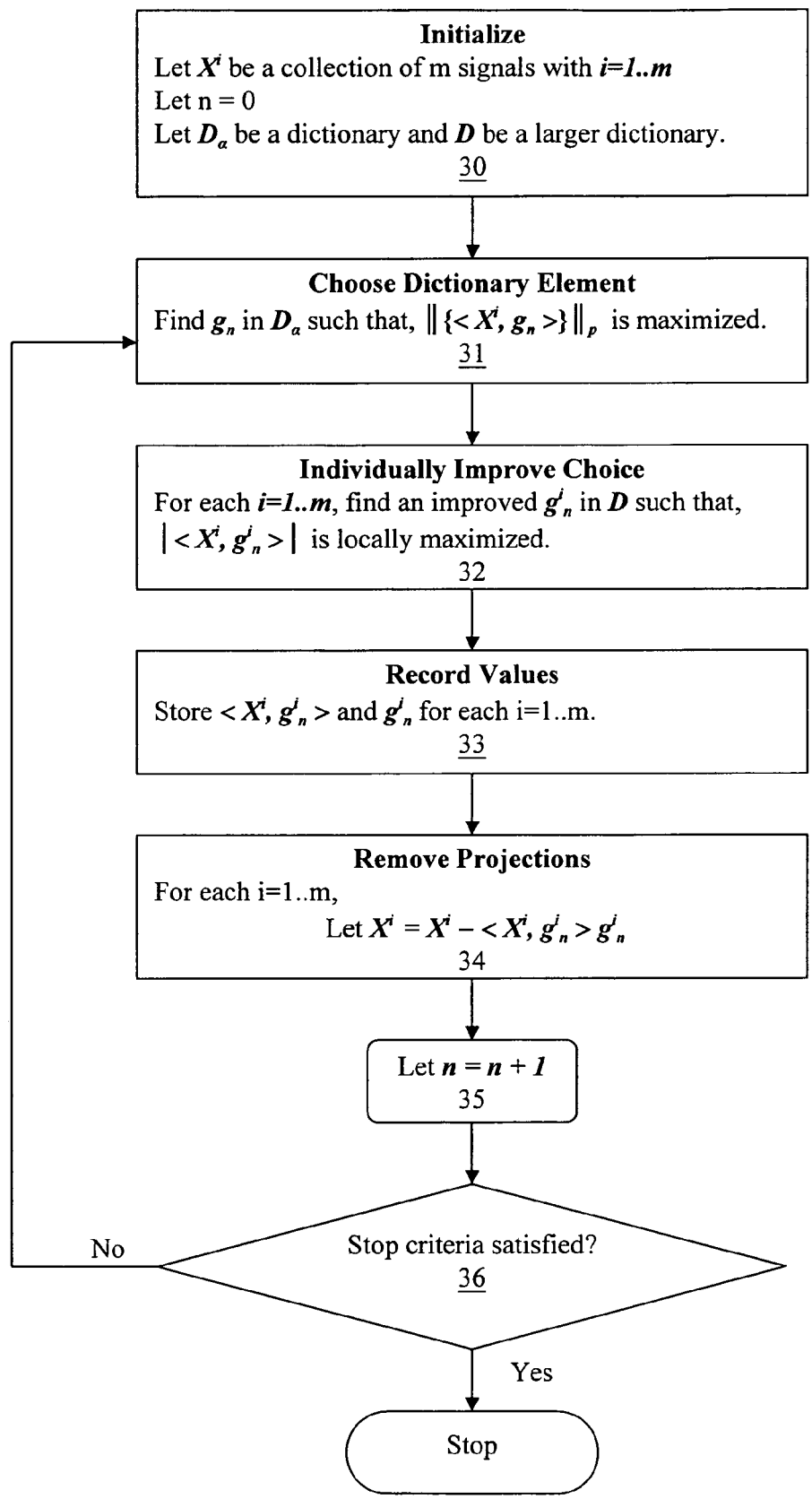
FIG. 3 is a programmatic flowchart illustrating the analysis algorithm with an additional novel improvement that allows automatic compensation for variation across the signal data set.

FIG. 3 is a programmatic flowchart depicting the analysis algorithm with an additional novel improvement. In particular, the algorithm now allows different dictionary elements $g^i_n$ to be chosen at each step for each of the vectors $X^i$. This significant change requires more storage of data, but results in an optimal balance between allowing variation in-between signals while representing them in a common framework.

In block 30 initialization proceeds as in block 20 of FIG. 2. As before, generally $D_a$ will be a subset of a larger dictionary D. In some embodiments of the present algorithm, however, D and $D_a$ may represent the same dictionary. Block 31 represents the same choice operation as block 21 of FIG. 2.

Block 32 depicts an important element of the improved algorithm. The process operates similarly to block 22 in the previous algorithm; however, in this case a separate search is performed for each vector $X^i$ and a different dictionary element $g^i_n$ for each will in general be discovered. In certain parameterized dictionaries to be discussed later it may be convenient to define the allowed variation in each parameter with some limit $\pm\Delta$. Constraining variation in the selected dictionary elements within each step helps ensure that the elements selected in that step are always related to each other. This allows the algorithm to automatically discover and equate similar components in different signals without requiring them to match exactly. The improvement facilitates discovery of common characteristics that are blurred or invisible to methods of prior art.

Block 33 is appropriately modified to store $g^i_n$ (or some representation therefore) for each $X^i$ rather than recording only one $g_n$ for the entire group as in the previous figures. Block 34 is appropriately modified to update each of the vectors $X^i$ by subtracting its projection on the individually selected $g^i_n$. This is the preferred embodiment; however, other variations including updating the vectors $X^i$ using a common $g_n$ as in the earlier algorithms, or calculating some related "average" element $\hat{g}_n$, and others, will be obvious to those skilled in the art. Such variations have been considered by the inventor and are within the scope of the present invention.

Blocks 35 and 36 again proceed similarly to blocks 14 and 15 (respectively) of the algorithm of FIG. 1. As before, a skilled programmer can easily translated the algorithm depicted in FIG. 3 into machine-readable instructions in numerous equivalent forms.

The algorithms are each depicted in a straightforward manner. However, certain reconfigurations and optimizations based upon well-known digital signal processing and/or computer science techniques are available, and these basic algorithms may be realized in numerous alternative but equivalent forms. These will be apparent to those skilled in the art and are contemplated within the scope of the invention.

It should be noted as well that the depicted algorithms could also be modified to choose only dictionary prototypes at each step with a common inner product sign across all signals in the group. Doing so is useful where the polarity (sign) of the changes is believed to be of fundamental importance to the analysis.

At the completion of any of the above-descried algorithms, a group of signals will be represented by a sequence of stored coefficients and a corresponding sequence of prototype elements selected from the dictionary. Typically, the analysis will be terminated after a finite number of steps n, determined by the stopping criteria. The vectors $X^i$ will then contain residues that are considered noise for all intents and purposes and are irrelevant to further processing. Strictly speaking, these residue vectors should be retained in the event that loss-less reconstruction of the original signals is necessary. Practically, we shall ignore them in discussing most of the preferred embodiments below.

In order to clearly differentiate between the residues remaining at the end of the execution and the values $X^i$ at any particular step, we will describe the stepwise signal values below as $X^i_n$. Thus the recorded inner product value stored at the $n^{th}$ step of the above algorithms (blocks 12, 23 and 33) can be written as $<X^i_n, g^i_n>$ without ambiguity. In the case of the first two algorithms, $g^i_n$ is the as same $g_n$ since the selected dictionary element does not vary with i. The stepwise value $<X^i_n, g^i_n>$ is also referred to as the $n^{th}$ coefficient in the derived representation space.

Within this novel representation system, comparisons between signals are available that are not easily made using methods of prior art. For example, we may consider commonalities within a class of signals by finding a mean with respect to the stepwise coefficients. If M is the number of signals $X^i$ in a class of interest, then $\bar{a}_n = 1/M \Sigma <X^i_n, g^i_n>$ represents an average value for the class of the $n^{th}$ coefficient of the representation space. Similarly we can find a geometric average, $\bar{a}_n^2 = 1/M \Sigma |<X^i_n, g^i_n>|^2$, that may be interpreted as an average energy associated with the class for the $n^{th}$ coefficient of the representation space. In both cases $g^i_n$ may be replaced with $g_n$ when, as in the first two algorithms, it is the same for all i.

We may threshold these calculated means in order to discover which components elements of the representation space best characterize each class of signals. For example, in some embodiments we may establish a fixed $\epsilon$ and interpret those coefficients with $|\bar{a}_n| > \epsilon$ as important to characterizing the class. In other embodiments we may consider $|<X^i_n, g^i_n> - \bar{a}_n| < \epsilon$ or $||<X^i_n, g^i_n>|^2 - \bar{a}_n^2| < \epsilon$ a better indicator of which components of the representation space best characterize the signal class. The specific method will depend upon the application.

In order to identify characteristics by which to best discriminate between signals classes one may search for a subset of component elements that have large differences in the group means. For example, if we denote two classes of signals with the superscripts $^\alpha$ and $^\beta$ then various embodiments of the invention may calculate $b_n = \bar{a}_n^\alpha - \bar{a}_n^\beta$ or $b_n^2 = (\bar{a}_n^\alpha)^2 - (\bar{a}_n^\beta)^2$ and target those components for which $|b_n| > \epsilon$.

These examples represent the type of comparisons that are available within the common representation space generated by the subject algorithms. In order to explain certain additional comparison methods, the concept of a dictionary needs to be detailed.

The dictionaries, D and $D_a$, utilized by the subject algorithms have been left very general since the methods so far described to not critically depend on the choice. So long as they contain at least one basis of the space of signal vectors then the algorithms will converge; and even if they are incomplete in this sense, the algorithms may still serve as useful sorting tools in some circumstances.

Certain classes of dictionaries, however, extend the usefulness of the invention. A dictionary may be created that reflects specific variations in well-understood parameters, such as scale, frequency, position, and so on. Other parameters will be interesting in specific applications and readily identified by those skilled in the art. If the dictionary is composed of prototype elements that span regions of interest in a particular parameter (or set of parameters), then the representation that results from the subject algorithms will have direct interpretation.

One example dictionary used in an embodiment of the present invention and in methods of prior art is the Gabor dictionary. This dictionary is generated from the Gaussian curve $g(t) = 2^{1/4} \exp(-\pi t^2)$ by modulating, shifting, and rescaling operations. The elements can be written as, $$g_{s,u,\xi}(t) = \frac{1}{\sqrt{s}} g\left(\frac{t-u}{s}\right) e^{i\xi t}$$

in a complex valued signal space. The dictionary also includes the Fourier basis and delta-function basis that represent the mathematical limits of those three operations. It is well known to those skilled in the art that a Gaussian generates a very compact simultaneous sampling of both time and frequency information. More precisely, the Gaussian exactly satisfies the limits of the classical uncertainty principal. The Gabor dictionary derived from a Gaussian includes prototype elements that can compactly represent signal components localized in time or frequency, or a blend of the two. Here "time" is used in reference to analyzing a collection of time varying signals; however, it will be understood by those skilled in the art that "space" or other dimensions of interest may be substituted. Equivalent real-valued Gabor elements as well as periodization techniques and other modifications useful for dealing with discrete, windowed signals will be known to those skilled in the art.

Figure 4:
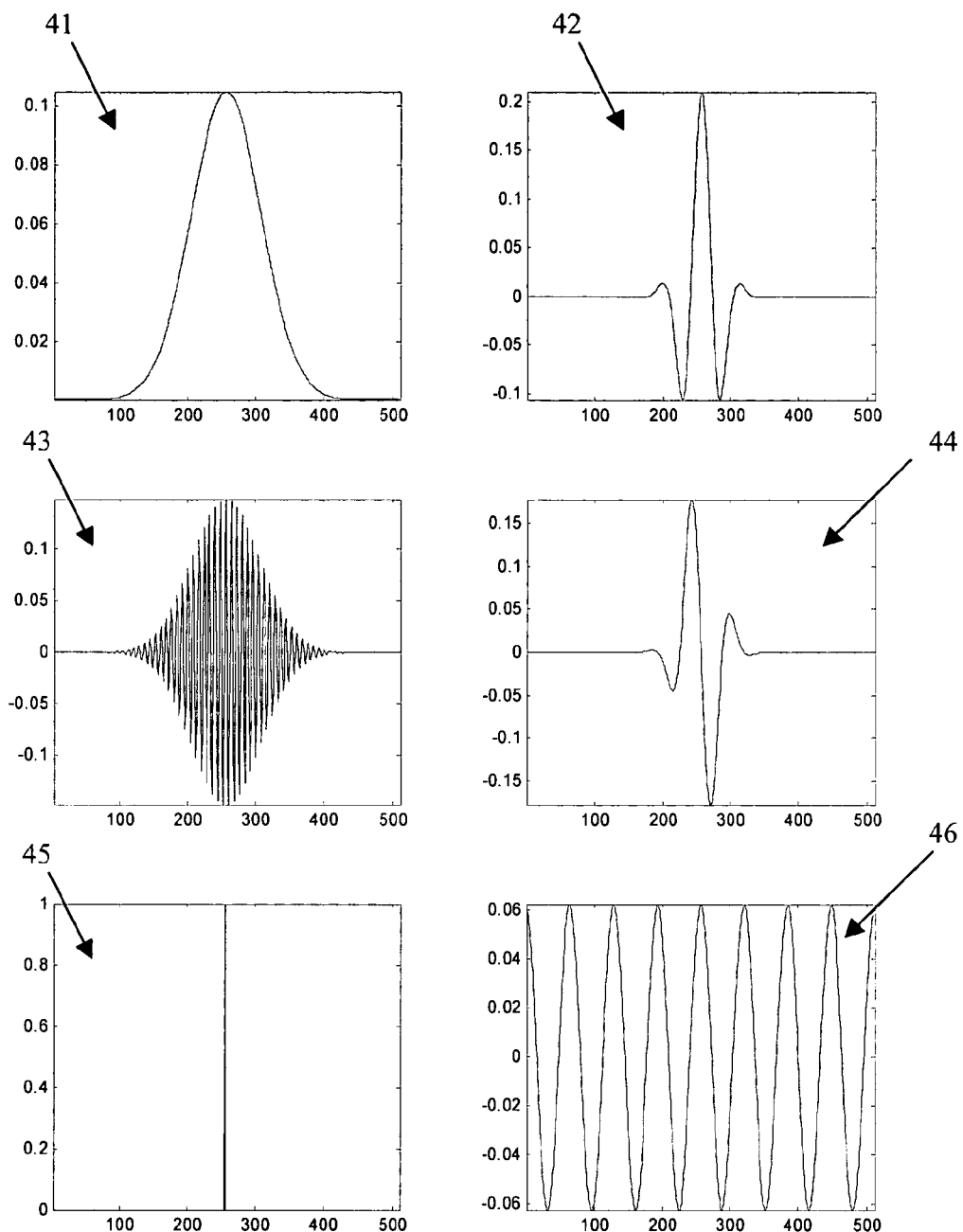
FIG. 4 illustrates six example prototype elements from a Gabor dictionary. This is one possible dictionary that may be used with the subject algorithms and the resulting parameterizations are a subject of the present invention.

A typical real-valued Gabor dictionary may be parameterized by four values. These are scale s, position (or time) u, frequency ξ, and phase φ. Examples elements from a discrete Gabor dictionary are shown in FIG. 4. These are generated in a 512 coefficient vector space. 41 is an unmodulated element at scale 128, 42 is at scale 64 with 8 cycle modulation, 43 is scale 128 with 64 cycle modulation, 44 is scale 64 with 8 cycle modulation at phase π/8, 45 is a scale 1 discrete Dirac delta element, and 46 is a Fourier element with 8 cycle modulation. These examples make clear the range of signal components that can be represented by elements in this dictionary.

Furthermore, other operations may be applied to the Gaussian to generate dictionaries that are parameterized on different features of interest. For example, linear or non-linear chirps elements may be useful in the study of certain sonar and radar applications. The parameters of interest will depend on the application. The dictionary used in the example embodiment should not be interpreted to limit the scope of the invention.

Mallat and Zhang showed that a finite sub-dictionary that covers the full range of parameter variation in adequate detail can be extracted from a Gabor dictionary. In some embodiments of the present invention, such a finite sub-dictionary may be used as the dictionary D in the subject algorithms. In other embodiments, the finite sub-dictionary may be used as $D_a$ in the second or third subject algorithms and the larger, infinite (continuously parameterized) Gabor dictionary may be used as D. Other variations are clearly possible.

If the subject algorithms are applied with a Gabor type dictionary, then each selected dictionary element may be uniquely described by its parameter values. For example, in the real-valued discrete dictionary described above, the parameters s, u, ξ, φ fully and uniquely describe each element. The algorithms may be embodied so that $g_n^i$ is represented by these four parameters when it is recorded in blocks 12, 23 and/or 33.

For the $i^{th}$ signal in an analysis group, the $n^{th}$ stepwise component extracted by the subject algorithms is fully described by its coefficient, $<X_n^i, g_n^i>$, and the parameters of $g_n^i$. These parameters may be written $s_n^i$, $u_n^i$, $\xi_n^i$, and $\phi_n^i$ following the established conventions above.

In methods of prior art based upon MP type algorithms it has not been possible to directly compare these parameters for different signals. This is because for a fixed value of n, the dictionary elements, $g_n^i$, selected by independently executed MP style algorithms have no relationship to each other. Mallat and Zhang and other derivative works have relied upon an additional transformation, based on the Wigner distribution, that translates these parameters into a density in the time-frequency plane. Disadvantages of this additional step have already been discussed above. Again, the present invention allows direct comparisons to be made between the resulting representations of any signals in the analyzed group.

Moreover, since these parameters can be directly compared, they can be averaged, subtracted and otherwise processed to directly characterize similarities and differences between signals in meaningful terms. For example, we may define a "parametric mean" in the representation space generated by the subject algorithm.

$$\bar{a}_n = \frac{1}{M} \sum_i \langle X_n^i, g_n^i \rangle$$

$$\bar{s}_n = \frac{1}{M} \sum_i s_n^i$$

$$\bar{u}_n = \frac{1}{M} \sum_i u_n^i$$

$$\bar{\xi}_n = \frac{1}{M} \sum_i \xi_n^i$$

$$\bar{\phi}_n = \frac{1}{M} \sum_i \varphi_n^i$$

Each new variable represents a mean over the appropriate group of signals in a data set. Other parameters could be similarly averaged. In addition, weighted averages may be created. For example, multiplying each summed element by the magnitude of its coefficient $|<X_n^i, g_n^i>|$ in the above and normalizing will result in emphasizing those elements with the greatest contribution to the signal group.

As described above, we may identify characteristics by which to best discriminate between signals classes by searching for a subset of component elements that have large differences in the group means. However, we can now utilize any of the parametric means as well as the calculated coefficient. For example, so long as the subject algorithm has analyzed the entire data set simultaneously, we may examine differences in any two sub-group means simply by subtracting them or by utilizing any appropriate statistical test. We may also clearly and concisely display the difference between groups to aid an analyst in visualizing the comparison.

By applying a threshold to parameter values, we may discover a subset of extracted signal components that compactly characterizes each group or sub-group. We may also discover subsets that compactly characterize differences.

Figure 5:
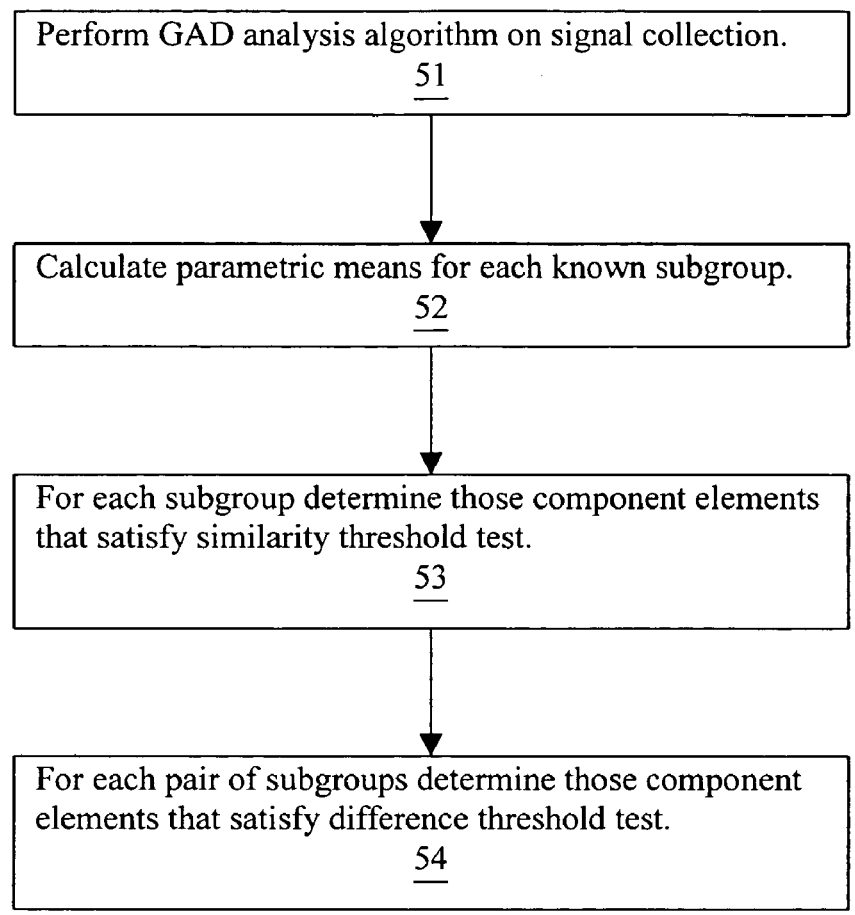
FIG. 5 is a process level flowchart that illustrates a method of extracting compact representations of similarity and difference criteria from the output of the subject analysis algorithms.

FIG. 5 outlines a process by which to discover appropriate subsets. This process assumes that we have already divided the signal data set into one or more subgroups based on a priori information, if necessary. We begin in block 51 by analyzing the entire signal data set with one of the subject algorithms; consider the algorithm of FIG. 3 as an example embodiment. After analysis, in block 52 separate parametric means are calculated for each subgroup of signals. Each of these subgroups is treated separately in block 53, by cycling through the list of signal components extracted in 51 and keeping only those that satisfies certain similarity conditions. For example in some embodiments we may keep only those components whose mean coefficients are large enough, e.g., $|\bar{a}_n| > \epsilon$. In others, we may keep only those whose coefficients are uniformly large enough, e.g., $|<X_n^i, g_n^i>| > \epsilon$ for all i. In others, we may keep only those whose coefficients are sufficiently close to the group mean, e.g., $|<X_n^i, g_n^i> - \bar{a}_n| < \epsilon$ for all i. In still others we may keep only those whose coefficients have sufficiently small group variance, e.g., $$\frac{1}{M}\sum_{i}|\langle X_n^i, g_n^i\rangle|^2 - |\bar{a}_n|^2 < \varepsilon$$

The coefficient is used as an example parameter. Similar threshold may be applied to the other parameters generated by the parametric mean, or to any combination of parameters. Each threshold operation, regardless of the parameters that are utilized, results in two lists of extracted components. One of these satisfies the threshold criteria, the other does not. The subset whose elements satisfy the threshold criteria constitutes a compact list of components that are significant in establishing similarity between signals in the group.

By working similarly in block 54, a subset of elements that compactly characterizes differences between groups and be discovered. For example, denoting as before two classes of signals with the superscripts $\alpha$ and $\beta$, various embodiments of the invention may calculate $b_n = \bar{a}_n^\alpha - \bar{a}_n^\beta$ or $b_n^2 = (\bar{a}_n^\alpha)^2 - (\bar{a}_n^\beta)^2$ and threshold for $|b_n| > \epsilon$, etc. Other embodiments will utilize other variations on the theme that are appropriate to the data of interest. The process of block 54 is not strictly limited to pairs of signal groups and comparisons that discover defining elements of three or more groups are readily devised.

Moreover the subsets discovered in processes 53 and 54 may be compared. By doing so, one may find components that are uniquely present in only one or the other group and contrast those to components that are present in both groups by vary in magnitude. In a further embodiment of the invention this idea can be used to construct a sorting scheme for future data that utilizes as few or as many components as necessary.

In parallel with the parametric means defined above, one may calculate a parametric variance for any parameter and then test the hypothesis that the two group parametric-means are different by using standard statistical methods. This allows us to establish confidence bounds on the discrimination parameters. Furthermore, we may consider pair-wise comparisons between signals; e.g., if a source experiment is designed so that trials under different conditions may be paired one-to-one we may utilize a paired T-test. Examining covariance of multiple parameters is also contemplated by the present invention.

Consider the parametric-means defined above for each extracted component, indexed by n. Even though they are means over a group of signals, they still retain descriptive information. For example, if the Gabor dictionary is utilized as described above, each parametric-mean component can still be described by scale, position, frequency and phase information. As with any MP method of prior art, we may visualize this information in the time-frequency plane. However, working in the time-frequency plane is unnecessary for comparing signals with GAD analysis and, unlike methods of prior art, the comparison retains sufficient information to reconstruct derived "average" signals in the original signal space. This is an important, distinguishing feature of the present invention.

In order to recover an approximation of the average signal in a group, one simply sums the extracted components, e.g., $$\tilde{X} = \sum_{n} \bar{a}_n \bar{g}_n$$

where n indexes those components that have been determined to be important to the group. In some embodiments these may be all extracted components, in others these will be subsets of extracted components that were discovered in process 53 or 54 above. Each $\bar{g}_n$ is simply the parametric-mean of the extracted components taken over the same signal group as $\bar{a}_n$. If a large continuous dictionary exists, as with a Gabor dictionary, then simply entering the calculated mean parameters into the continuous analytic formula generates each $\bar{g}_n$.

The invention facilitates reconstruction of other derived signals as well, including group-mean sums, differences, and so forth. In many applications the reconstructed signal may be used to better understand the generating process. Its shape will be more complex than the individual extracted elements used to discover it. This process may be used to reconstruct so called "signature" signals, as described in the background to the invention. Signatures, whether represented in the original signal space or by a list of extracted components, can be analyzed much more tangibly than by methods of prior art. Some applications are addressed below.

The invention as so far described is most directly applicable to cases in which observed signals are aligned in some fashion. If the patterns of interest occur at radically different positions within different signals in the group, the subject algorithm will need to allow vary large differences in the $g_n^i$ selected for each signal at each step. In applications where the recordings are time (or space) aligned to an external reference, this situation is not generally a problem because the algorithm can accommodate the jitter. In other applications, however, signals recorded at consistently referenced times (or positions) will need to be compared to signals recorded at random times (or positions.) The randomly correlated signals are often referred to as "baseline" data or "background noise" depending on the application.

The invention can be adapted to accommodate these comparisons by several means. In the description of the algorithm of FIG. 3 above, it was noted that variation the stepwise $g_n^i$ might be constrained by establishing an allowed range, $\pm\Delta$, for each parameter of the dictionary. For example, position might be constrained so that $|u_n^i - u_n^j| < \Delta_u$ for all signals i and j in the analysis data set. Setting $\Delta_u$ large accommodates more jitter among signals; setting $\Delta_u$ small ensures that only very similar signal components are compared. If the data is divided into baseline and correlated subgroups, we might take advantage of the existing algorithm by simply setting $\Delta_u$ large for the baseline subgroup and small for the correlated subgroup. While this method is applicable in some instances, it can be shown (see Dissertation) that it will introduce a bias into the analysis that can affect the algorithm in complex and often undesirable ways.

Figure 6:
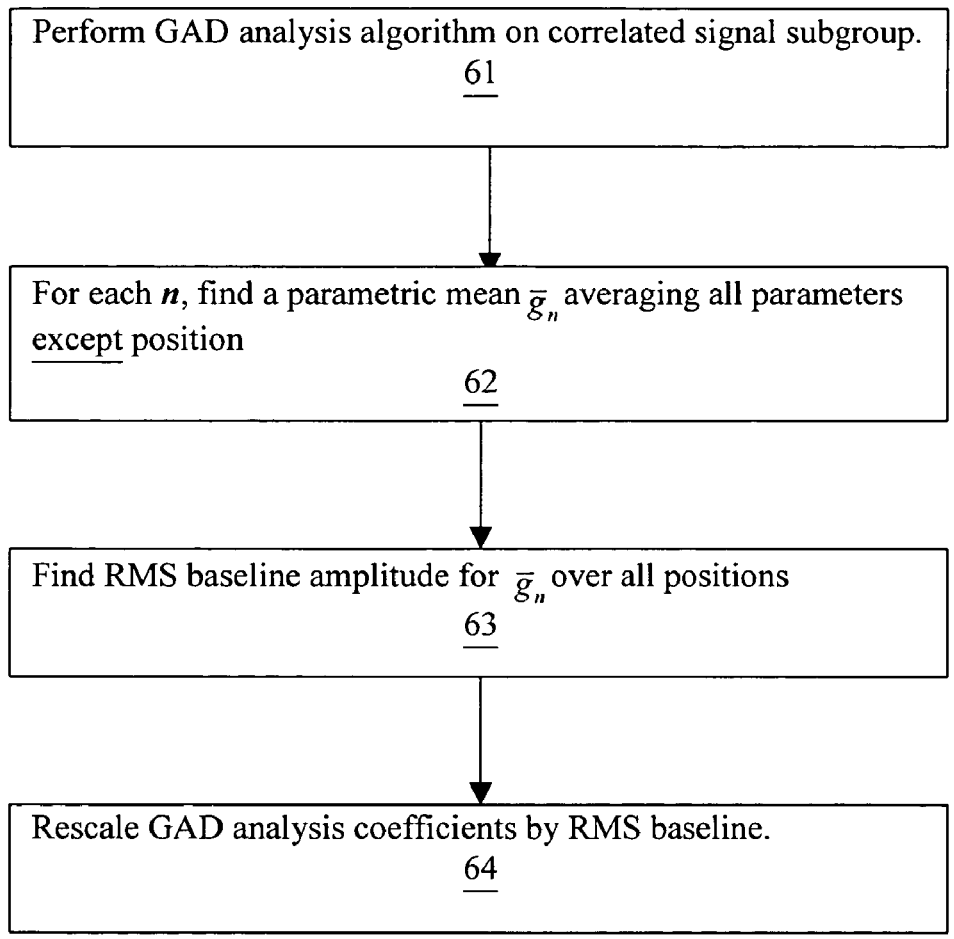
FIG. 6 is a process level flowchart that illustrates a method making comparisons between correlated signals in a data set and uncorrelated baseline signals.

A second method of accommodating baseline data is to treat it separately. First the analysis algorithm is executed on the correlated signal group only. This results in a set of coefficients and a corresponding set of extracted signal prototypes $g_n^i$. The expected amplitude of each extracted signal component $g_n^i$ is then estimated from the baseline data. We can then compare the coefficients estimated by the analysis algorithm to the expected value derived from baseline data. In one embodiment, outlined in FIG. 6, we utilize the root-mean-squared (RMS) amplitude of each element in the baseline for a comparison value.

This embodiment begins in block 61 by performing the usual analysis on the subgroup of signals that are reasonably time correlated. Then, in 62, a parametric mean is calculated for each of the extracted prototype components for all dictionary parameters except that of position. This means that the resulting parametric mean $\bar{g}_n$ is a function of position, u. We indicate this by writing $\bar{g}_n(u)$. If M is the number of signals in the baseline group and N the number of possible positions in the signal window, i.e. the signal vector length, then the RMS amplitude in block 63 can be calculated by $$b_n^2 = \frac{1}{M}\sum_i \frac{1}{N}\sum_u |\langle X_n^i, \bar{g}_n(u)\rangle|^2$$

where $b_n$ is then the RMS baseline amplitude for parameters other than u associated with the mean element $\bar{g}_n$ for each n. For technical reasons, the $b_n$ so estimated are not directly comparable to each other; however, they are comparable to the stepwise coefficients estimated by the analysis algorithm for the correlated signal group. To make use of this comparison, we characterize each extracted prototype in the analysis by rescaling its coefficient (block 64) with the baseline data; i.e., the value, $$\frac{\langle X_n^i, g_n^i\rangle}{b_n}$$

expressing each coefficient as a proportion of the baseline.

RMS amplitude was chosen for the example embodiment rather than the mean inner product for several reasons. First, the results are always non-negative real numbers even if the analysis is complex valued. Second, since the analyses algorithm allows the inner products at each step to vary without regard to sign, it is inappropriate to consider sign in the baseline comparison. (As was noted previously, the algorithms can be modified to choose only dictionary prototypes at each step with a common inner product sign across all signals in the group. In that case mean baseline inner product might be of interest rather than RMS baseline amplitude.) Finally, the square amplitude can be interpreted as the energy associated with each $\bar{g}_n$, which leads to easily interpreted comparisons in certain applications of the invention.

We may utilize the various comparison methods describe above on the rescaled data in order to compare subgroups of the correlated data. We may also make comparisons with the baseline data by considering the proportionate change relative to baseline. Specifically, $$\frac{|\langle X_n^i, g_n^i\rangle| - b_n}{b_n}$$

or $$\frac{|\langle X_n^i, g_n^i\rangle|^2 - b_n^2}{b_n^2}$$

are two reasonable embodiments of this comparison idea. In either case a positive value indicates a proportionate increase over baseline and a negative value indicates a proportionate decrease from baseline. However, caution must be used in applying this comparison method when values near the lower limit of −1. These extracted prototypes are only weakly represented and may be near or below the effective dictionary-noise floor of the algorithm. Estimates of proportionate decreases may therefore be poor.

Threshold methods similar to those described previously can be applied to these proportionate change estimates as well. Furthermore, signal components that are present in the correlated data set and not the baseline data can be discovered by examining prototypes that have a positive proportionate change value, e.g., $$\frac{|\langle X_n^i, g_n^i\rangle|^2 - b_n^2}{b_n^2} > \varepsilon$$

where $\varepsilon \geq 0$. Similarly, signal components that are present in the baseline data set and absent from the correlated data may be discovered by examining prototypes that have negative proportionate change values.

For any selected subsets of extracted prototypes one can reconstruct a signal in the original signal space just as was described above. The resulting reconstructed signal will be directly comparable in scale and amplitude to the signals in the correlated data set. Again, this method may be used to extract signatures by comparing "active" condition correlated signal data to "inactive" condition baseline data.

The baseline comparison method outlined above can also be used to compare a correlated signal set to another correlated signal set or even one data set to itself. In this case positive proportionate change values are interpreted as signal components that are significantly above the noise floor of the signal space. Self-comparison is an additional method of automatically identifying components of interest in a large, unclassified data set.

In order to improve over the simple threshold comparison, variance may be considered as well as the proportionate magnitude of changes. A Z-score may be calculated by well-known means that consider the change from baseline scaled by variance.

The essence of the present invention may be further embodied in a number of obvious applications. As described in the Summary section above, data compression for both storage and transmission is often based on transforms that concentrate important information into a small number of coefficients. Numerous ways of utilizing the present invention for data compression will be obvious to those skilled in the art, once they understand the novel subject algorithms contained herein. One such compression algorithm is simply to threshold the extracted prototypes as described above, and discard those with smaller values from the recorded description. Another is simply to set stopping criteria in the analysis algorithms so that only the first, most significantly represented prototype elements are extracted in the first place. Either of these will yield a compact description of the most important elements in the signal space that can be used to reconstruct an approximation to the signal by the methods described above.

These identical method can be used for noise reduction under the assumption that the noise is additive and that the smaller, discarded elements are more likely to represent "noise" than meaningful "signal." Implementations will be obvious to those skilled in the art.

Another well-known data compression idea is to record only changes from a previous baseline rather than repeating unchanged data. This is sometimes referred to as "delta-coding". The present invention facilitates this in several ways. First of all, signals may be analyzed into a common representation framework and each sequential signal may be encoded as changes relative to the previous. Video frame compression would be one obvious candidate application, as would other streaming data situations. Secondly, an entire signal set may be analyzed and each signal may be re-encoded based on its difference from the parametric mean. Other variations include first discovering similar subgroups of the analyzed signal set and then encoding differences relative to the subgroup parametric means.

Methods related to delta-coding compression can also be used for detecting changes in signals. Applications in motion detection, speech recognition and other fields will be evident to those skilled in the art.

The present invention also offers a method of characterizing and removing noise that goes beyond those of prior art. Noise in any parameter of a parameterized dictionary may be targeted. The algorithm of FIG. 3, allows for constrained variation in the stepwise $g_n^i$ by establishing an allowed range, $\pm\Delta$, for each parameter of the dictionary. For example, position might be constrained so that $|u_n^i - u_n^j| < \Delta_u$ for all signals i and j in the analysis data set. By choosing $\Delta_u$ appropriately the algorithm automatically equates similar component features in each signal within the variation range. By examining the mean variation in these equated components $g_n^i$ the signals can be re-aligned to compensate for time (or positional) jitter. Moreover, any parameter that is allowed to vary in the subject algorithm can be treated similarly. This means that for example, using a Gabor dictionary, frequency instabilities, scale variations, and so on can be automatically detected, analyzed and reduced. Indeed, any signal reconstructed from or adjusted by the parametric-mean method already described will automatically compensate for these variations. This method of multi-dimensional noise reduction is an important application of the present invention.

Several methods of data classification are also enabled by the present invention. As discussed above, the subject algorithms automatically extract those features that are strongly represented in the data set, whether those features are represented in one signal, in a subgroup of signals, or in all signals. By using thresholds and other means described above it is straightforward to extract classes automatically from an undifferentiated group of signals. In addition, since the present invention extracts an easily manipulated, multi-dimensional representation space from the data, any of numerous methods of prior art may be subsequently applied to discover classes. Once the data has been appropriately re-represented the application of these methods will be obvious to those skilled in the art.

Furthermore, once the analysis algorithm characterizes signal classes in one corpus of data, novel signal data may also be quickly sorted as it comes in. To do so, we use the extracted prototype components identified as important to the comparisons by thresholds or other means above. Taking an inner product between the novel signal and each parametric-mean element $\bar{g}_n$ generates a compact description of the novel signal that is directly comparable to the group means. The novel signal can then be classified on a "nearest neighbor" basis or by other well-known means.

The invention also facilitates sorting of novel data by other means. Using the reconstruction methods described above, a parametric-mean signature of each class can be realized in the original signal space. This puts the comparison into terms that are naturally addressed by any suitable methods in the prior art. However, the comparison would not be possible without the subject methods of the present invention.

Clearly the dictionary selected for any particular embodiment of the present invention will play a important role in its functionality. The example Gabor dictionary embodiment was given because for many classes of signals it represents a very complete, continuously parameterized and unbiased choice. As discussed, other dictionaries may be more applicable to other classes of signals. In some embodiments the dictionary elements will be chosen to represent specific features known to be important in the classification. In addition, it is possible to use the subject methods to customize dictionaries to an application.

Figure 7:
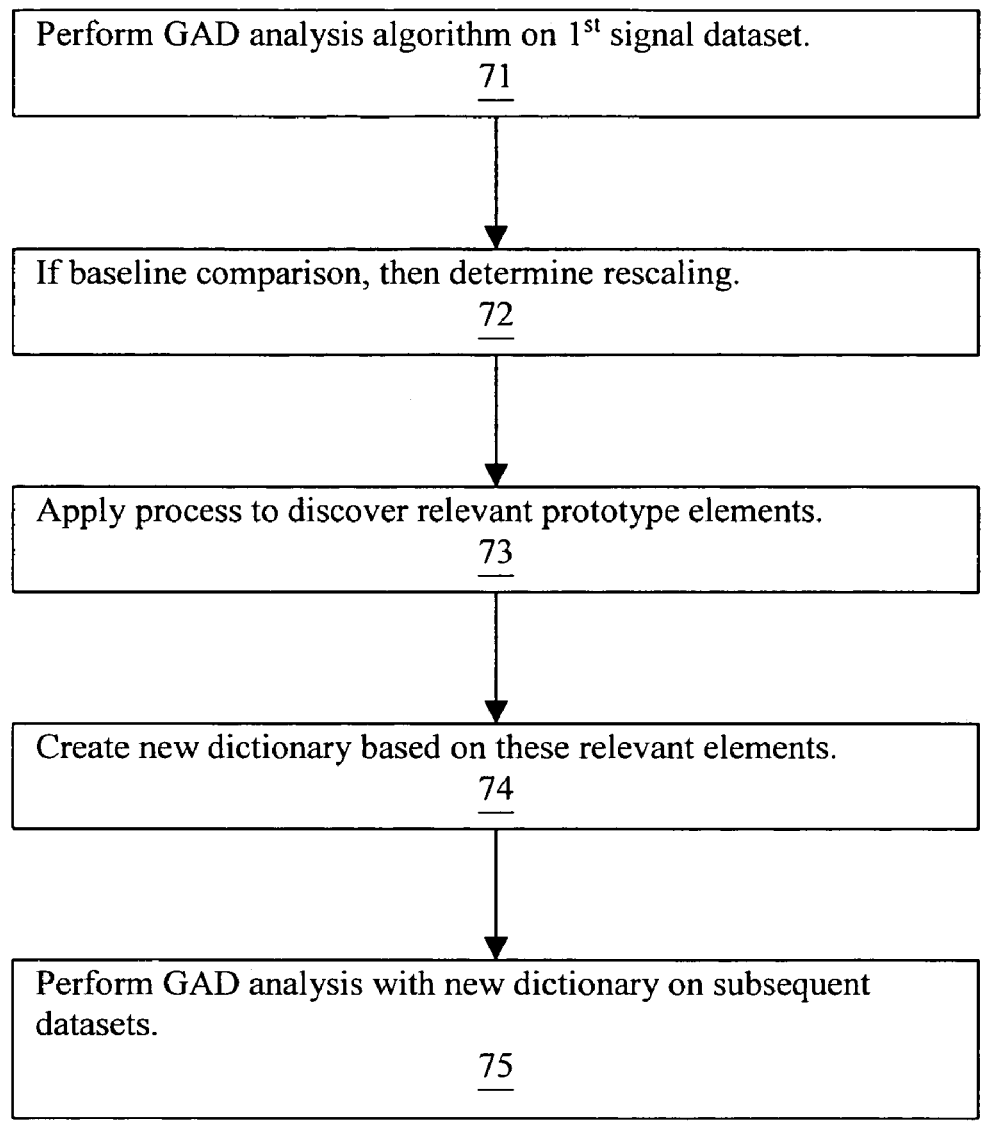
FIG. 7 is a process level flowchart that illustrates a method of automatically generating a new, application specific dictionary from a much more general-purpose dictionary.

The process is illustrated in FIG. 7. Starting with a general dictionary thought to be applicable to the data set, in block 71 the analysis algorithm is applied to the primary data set. In block 72, if the data set is to be compared to a baseline then apply the rescaling process detailed above and in FIG. 6. Next (block 73) apply the threshold process detailed above and in FIG. 5 to determine component prototype elements that are relevant to the comparison process. Finally (block 74) create a new dictionary with only those sub-selected prototype elements. Alternatively in 74, by considering co-variance of the prototype elements one can create a new dictionary that contains weighted sums of the original dictionary elements that may be even more appropriate to subsequent analysis of similar data sets. The weighted sum prototype elements are a generalization of the idea of reconstructing a signature for each data set; in this case there are many component signatures.

The subject algorithms can then be applied (block 75) on the same or subsequent data sets using the resulting new dictionary. The analysis will be faster, since the dictionary is smaller, and the analysis results will be directly comparable to those of the previous corpus. Furthermore, if the new dictionary elements have already been studied then each subsequent analysis will characterize new signals in familiar and useable terms.

The methods herein disclosed have been demonstrated in a working system applied to both synthesized test data and actual data sets. The system was implemented on a standard general-purpose computer, using the algorithms and methods herein disclosed in conjunction with a real-valued Gabor dictionary.

In practical applications, detailed in Dissertation, example signature signals were synthesized, mixed with noise and analyzed. In one example demonstration, a pair of model signals was constructed using chirps, truncated sine waves and transients. Both model signals contained a rising linear chirp in common. One model signal contained an additional chip offset in time from the first and a mixed set of truncated sine waves and transients designed to be difficult to discriminate from one another using classical techniques. The second model signal contained a different mix of components. Signal components for each were chosen so that between the two models some overlapped in time or frequency completely, some partially and some not at all. Components were deliberately chosen so that none could be exactly reconstructed with a small number of Gabor dictionary atoms.

Two ensembles of signals were created by jittering the respective first or second model signal in time by a random amount. Independent Gaussian noise was then added to each of the signals in the two ensembles. The amplitudes of the various signal components in the models varied, so signal to noise ratio ranged from moderate to very poor depending on the component. The two resulting collections of signals represent two experimental conditions in which noise and time jitter have thoroughly obscured any underlying similarities in the collected samples. Neither the algorithm nor the dictionary contained any a priori knowledge of the signal components characterizing the two conditions.

A GAD analysis was performed on the entire set of signals. The algorithm quickly converged and, using parametric mean techniques disclosed herein, the system was able to: (1) recover representations of the components of original model signal for each of the two group with most of the noise and time-jitter removed; (2) discover representations of those specific components that were common to both classes of signals; (3) discover representations of those specific components that were unique to each class of signals; (4) separately reconstruct in the time domain signals representative of components specific to each class and components common to both classes. These results could easily be applied to detect similar patterns in future data sets and to quickly discriminate into which class a novel signal should be sorted. Furthermore, the resulting signal components representative of each class clearly emerged and could be characterized by their amplitude, time location, frequency range, scale, and phase; or could be considered jointly as a reconstructed, time-domain signal.

In a second example demonstration, another model signal was constructed and similarly buried in independent noise to create an ensemble of signals. In this second example, the signals were placed in a background of high amplitude 1/f noise, and both time-jitter and systematic time drift were introduced into the collection of samples. While the model signal had a simple, easily identified form, it was impossible to identify visually in any ensemble samples. A second ensemble of independent 1/f noise samples was also created.

A GAD analysis was performed on the ensemble of obscured signals, and using the methods for discrimination from background noise herein disclosed, the system was able to: (1) identify and distinguish model signal components from the background noise; (2) de-blur the resulting representation by removing time jitter and drift; (3) reconstruct a responsible approximation to the original model signal in the time domain.

In addition to synthesized examples, the method has also been successfully applied to analyze human EcoG data. As further detailed in Dissertation, Eletrocortocography (EcoG) data collected as part of previous medical research studies was re-examined by the inventor using the methods disclosed herein. In these studies, each subject was asked to make sustained voluntary muscle contractions (a clenched fist) in response to visual stimuli. Electrode placed directly on the subject's brain recorded electrical signals during these events and between them. In prior studies, unrelated to the present invention, the data had been analyzed using more traditional Fourier based methods.

Samples of EcoG data from two different electrodes were reanalyzed using the GAD methods herein disclosed, and compared with the baseline data resulting from recordings made between events. The system was able to (1) discover common components in each set of EcoG recordings indicative of muscle contraction; (2) discover and isolate systematic noise generated by a nearby video monitor that had not been accounted for; (3) reconstruct in the time-domain a clean signature signal representative of each set of electrode data. A meaningful time-domain reconstruction of the EcoG signature pattern associated with this or any other task has not been available by prior methods.

The discovered patterns were consistent with those identified in previous Fourier based analysis, but had much improved detail and time-frequency resolution. The reconstructed signature was very well correlated with muscle twitch recordings (EMG) from the same sessions, and further GAD type analysis of the EMG signals reviled fine structure correlations with the EcoG data which were entirely invisible to previous methods.

As with the synthesized examples, these results could easily be applied to detect similar patterns in future data sets and to quickly discriminate into which class a novel signal should be sorted. In one application a system using the derived signature could detect, for example, when a subject clenches his fist by observing only brain activity.

Furthermore, the resulting signal components representative of the task condition are now well characterized by their amplitude, time location, frequency range, scale, and phase. This enables researchers interested in the brain to consider how these specific components arise. Moreover, the reconstructed, de-noised, time-domain signal enables brain researchers to consider the process that might generate the particular signature pattern.

I claim:

1. Apparatus for ascertaining a signature characteristic of a collection of signals for discriminating between and among such signals and for classifying other signals using said signature, said apparatus comprising:
   a) a dictionary comprising a plurality of prototype signals;
   b) means for selecting a specific prototype signal such that for at least one signal of the collection an inner product with the selected prototype is non-zero;
   c) means for recording the selected prototype signal;
   d) means for subtracting from each signal in the collection a projection of that signal on the specific prototype signal and for redesignating the result of the subtraction as the signal in the collection for the next iteration;
   e) means for imposing a stop criterion; and
   f) means for directing the apparatus back to means (b) unless the stop criterion is met.

2. Apparatus for ascertaining a signature characteristic of a collection of signals for discriminating between and among such signals and for classifying other signals using said signature, comprising:
   a) a dictionary comprising a plurality of prototype signals;
   b) means for determining an inner product between each of the signals in the collection and at least one of the prototype signals in the dictionary;
   c) means for selecting a specific prototype signal such that for at least one signal of the collection the inner product of the specific prototype signal with the at least one signal of the collection is non-zero;
   d) means for recording the specific prototype signal and the inner product of each of the signals from the collection with the prototype signal;
   e) means for subtracting from each signal in the collection a projection of the signal on the specific prototype signal and for redesignating the result of the subtraction as the signal in the collection for the next iteration;
   f) means for imposing a stop criterion; and
   g) means for directing the apparatus back to means (b) unless the stop criterion is met.

3. Apparatus for ascertaining a signature characteristic of a collection of signals for discriminating between and among such signals and for classifying other signals using said signature, comprising:

a) a dictionary comprising a plurality of prototype signals;
b) a subdictionary which is a subset of the dictionary;
c) means for determining an inner product p-norm for the signals in the collection for each of the prototype signals in the subdictionary;
d) means for selecting a specific prototype signal in the subdictionary that substantially maximizes said inner product p-norm;
e) means for recording the specific prototype signal and an inner product of each of the signals from the collection with the prototype signal;
f) means for subtracting from each signal in the collection a projection of the signal on the specific prototype signal and for redesignating the result of the subtraction as the signal in the collection for the next iteration;
g) means for imposing a stop criterion; and
h) means for directing the apparatus back to means (c) unless the stop criterion is met.

4. Apparatus for ascertaining a signature characteristic of a collection of signals for discriminating between and among such signals and for classifying other signals using said signature, comprising:
a) a dictionary comprising a plurality of prototype signals;
b) a subdictionary which is a subset of the dictionary;
c) means for determining an inner product p-norm for the signals in the collection for each of the prototype signals in the subdictionary;
d) means for selecting a specific prototype signal in the subdictionary that substantially maximizes said inner product p-norm;
e) means for determining, for each individual signal in the collection, a separate prototype signal that locally maximizes the magnitude of an inner product of the separate prototype signal with the individual signal from the collection;
f) means for recording the separate prototype signal and the maximized inner product of each individual signal from the collection with each determined separate prototype signal;
g) means for subtracting from each signal in the collection a projection of the signal on the specific prototype signal and for redesignating the result of the subtraction as the signal in the collection for the next iteration;
h) means for imposing a stop criterion; and
i) means for directing the apparatus back to means (c) unless the stop criterion is met.

5. A method for ascertaining and identifying similarities and differences among members of a collection of signals and for representing a collection of signals in an easily compared format, comprising the steps of:
a) establishing a dictionary comprising a plurality of prototype signals;
b) selecting a specific prototype signal from the dictionary such that an inner product of said prototype with at least one signal of the collection is non-zero;
c) recording the selected prototype signal and recording its inner product with each of the signals from the collection;
d) subtracting from each signal in the collection a projection of that signal on the selected prototype signal and redesignating the result of the subtraction as the signal in the collection for the next iteration;
e) imposing a stop criterion; and
f) repeating steps (b) through (e) until the stop criterion is met.

6. The method of claim 5, wherein the step of selecting a specific prototype signal from the dictionary comprises determining which prototype in the dictionary substantially maximizes an inner product p-norm for the signals in the collection.

7. The method of claim 5, wherein the step of selecting a specific prototype signal from the dictionary is followed by an additional step of searching for an improved prototype signal choice in the dictionary or in a second dictionary.

8. The method of claim 5, wherein the dictionary comprises a set of Gabor atoms.

9. A method for ascertaining and identifying similarities and differences among members of a collection of signals and for representing a collection of signals in an easily compared format, comprising the steps of:
a) establishing a dictionary comprising a plurality of prototype signals;
b) selecting a first specific prototype signal from the dictionary such that that an inner product of said prototype with at least one signal of the collection is non-zero;
c) for each individual signal in the collection, selecting an improved prototype signal from the dictionary that is similar to the first specific prototype signal but has a larger inner product magnitude with said each individual signal;
d) recording each improved prototype signal and recording its respective inner product with the corresponding signal from the collection;
e) subtracting from each signal in the collection a projection of its respective improved prototype signal and redesignating the result of the subtraction as the signal in the collection for the next iteration;
f) imposing a stop criterion; and
g) repeating steps (b) through (f) until the stop criterion is met.

10. The method of claim 9, wherein the step of selecting a first specific prototype signal from the dictionary comprises determining which prototype in the dictionary substantially maximizes an inner product p-norm for the signals in the collection.

11. The method of claim 9, wherein the step of selecting an improved prototype for each individual signal in the collection is conducted by searching a dictionary that differs from the dictionary used to establish the first specific prototype.

12. The method of claim 9, wherein the dictionary comprises a set of Gabor atoms.

13. The method of claim 9, wherein
a) the dictionary comprises a set of prototype signals that are parameterized in at least one variable; and
b) the step of selecting an improved prototype for each individual signal in the collection is constrained in order to limit parameter variation between said improved prototypes.

14. A method of characterizing at least one group of signals and of expressing and visualizing its characteristics, comprising the steps of
a) creating an aggregate collection of signals comprising all groups of interest;
b) parameterizing a dictionary of prototype signals in at least one variable;
c) applying the method of either claim 5 or claim 9 in order to represent each signal in said aggregate collection in terms of at least one prototype dictionary element; and
d) calculating a parametric mean over at least one group of interest.

15. A method of ascertaining and characterizing similarities and differences in and between signals or groups of signals and of expressing and visualizing said characteristics, comprising the steps of:
   a) creating an aggregate collection of signals comprising all groups of interest;
   b) applying either the method of claim 5 or the method of claim 9 in order to represent each signal in said aggregate collection in terms of at least one prototype dictionary element;
   c) determining for each subgroup those component prototype elements selected in step (b) that satisfy a similarity threshold test; and
   d) determining for each pair of subgroups those component prototype elements selected in (b) that satisfy a difference threshold test.

16. The method of claim 15, wherein
   a) the dictionary comprises a set of prototype signals that are parameterized in at least one variable; and
   b) after applying either the method of claim 5 or the method of claim 9, a parametric mean is calculated for each signal group of interest.

17. The method of claim 15, wherein the similarity threshold test keeps only those components whose mean coefficients are larger in magnitude than some set value.

18. The method of claim 15, wherein the similarity threshold test keeps only those components whose coefficient and/or other parameter values are sufficiently close to the group mean.

19. The method of claim 15, wherein the similarity threshold test keeps only those components whose coefficients and/or other parameter values have sufficiently small group variance.

20. The method of claim 15, wherein the difference threshold test keeps only those components whose coefficients and/or other parameter values differ between groups by more than some threshold amount.

21. The method of claim 15, wherein the difference threshold test keeps only those components whose squared coefficients and/or other squared parameter values differ between groups by more than some threshold amount.

22. A method of reconstructing a representative average signature signal for a collection of signals and of visualizing said signature signal, comprising the steps of:
   a) parameterizing a dictionary of prototype signals in at least one variable;
   b) applying either the method of claim 5 or the method of claim 9 in order to represent each signal in said collection in terms of at least one prototype dictionary element;
   c) calculating a parametric mean over the signal group of interest;
   d) sub-selecting two or more prototype elements from the calculated parametric mean set by means of similarity or difference tests; and
   e) summing said sub-selected parametric mean prototype elements scaled by their respective parametric mean coefficient in order to recover a representative signal.

23. A method of reconstructing a signature signal representative of the similarity or difference between signals or groups of signals within a collection and of visualizing said signature signal, comprising the steps of:
   a) parameterizing a dictionary of prototype signals in at least one variable;
   b) applying either the method of claim 5 or the method of claim 9 in order to represent each signal in said collection in terms of at least one prototype dictionary element;
   c) calculating a parametric mean for each signal or subgroup of signals;
   d) sub-selecting at least one prototype element relevant to the comparison between subgroups from the calculated parametric mean sets; and
   e) summing said sub-selected parametric mean elements scaled by their proportional coefficients in order to recover a representative signal.

24. A method of ascertaining and characterizing similarities and differences between a collection of at least one signal and a group of uncorrelated baseline signals, comprising the steps of:
   a) parameterizing a dictionary of prototype signals in at least one variable, including at least the variable of position;
   b) applying either the method of claim 5 or the method of claim 9 in order to represent each signal in said collection in terms of at least one prototype dictionary element;
   c) calculating a list of parametric mean prototype elements for the collection as a function of position by averaging all parameters except position;
   d) calculating the RMS amplitude over all possible positions of each of the parametric mean prototype elements within the baseline signal group; and
   e) rescaling the coefficients derived in step (b) by the RMS baseline amplitude values.

25. The method of claim 24, additionally comprising the step of making comparisons between at least one signal with the baseline data by considering the proportionate change in said signal relative to the baseline for specific selected prototype elements scaled by their RMS amplitude.

26. A method of comparing a collection of signals to itself in order to automatically discover components of interest, comprising the steps of:
   a) parameterizing a dictionary of prototype signals in at least one variable, including at least the variable of position;
   b) applying either the method of claim 5 or the method of claim 9 in order to represent each signal in said collection in terms of at least one prototype dictionary element;
   c) calculating a list of parametric mean prototype elements for the collection as a function of position by averaging all parameters except position;
   d) calculating the RMS amplitude over all possible positions of each of the parametric mean prototype elements within the collection of signals; and
   e) rescaling the coefficients derived in (b) by the RMS baseline amplitude values.

27. A method of data compression and retrieval for a collection of signals and of noise reduction for a collection of signals, comprising the steps of:
   a) applying either the method of claim 5 or the method of claim 9 in order to represent each signal in said collection in terms of at least one prototype dictionary element;
   b) applying at least one threshold to sub-select a list of at least one prototype element from those derived in step (a);
   c) storing information sufficient to describe said sub-selected prototype elements, along with respective coefficients for each signal; and d) reconstructing each signal from the sum of stored prototype elements multiplied by their respective coefficients.

28. A method of data compression and retrieval for a collection of signals and of noise reduction for a collection of signals, comprising the steps of
   a) parameterizing a dictionary of prototype signals in at least one variable, including at least the variable of position;
   b) designating a group of baseline signals;
   c) applying either the method of claim 5 or the method of claim 9 in order to represent each signal in said collection in terms of at least one prototype dictionary element;
   d) calculating a list of parametric mean prototype elements for the collection as a function of position by averaging all parameters except position;
   e) calculating the RMS amplitude over all possible positions of each of the parametric mean prototype elements within the baseline signal group;
   f) rescaling the coefficients derived in step (c) by the RMS baseline amplitude values;
   g) applying at least one threshold to sub-select a list of at least one prototype element from those derived in step (c);
   h) storing information sufficient to describe said sub-selected prototype elements, along with respective coefficients for each signal; and
   i) reconstructing each signal from the sum of stored prototype elements multiplied by their respective coefficients.

29. The method of claim 28, wherein the designated baseline signal group includes at least one signal from the target collection of signals to be processed.

30. A method of data compression and retrieval for a collection of signals and of noise reduction for a collection of signals, comprising the steps of
   a) applying either the method of claim 5 or the method of claim 9 in order to represent each signal in said collection in terms of at least one prototype dictionary element, with stopping criteria selected such that the algorithm will end with signal residuals smaller in magnitude than a desired resolution;
   b) storing information sufficient to describe the selected prototype dictionary elements, along with respective coefficients for each signal; and
   c) reconstructing each signal from the sum of stored prototype elements multiplied by their respective coefficients.

31. A method of data compression and retrieval for a collection of signals and of noise reduction for a collection of signals, comprising the steps of
   a) parameterizing a dictionary of prototype signals in at least one variable, including at least the variable of position;
   b) designating a group of baseline signals;
   c) applying either the method of claim 5 or the method of claim 9 in order to represent each signal in said collection in terms of at least one prototype dictionary element, with stopping criteria selected such that the algorithm will end with signal residuals smaller in magnitude than a desired resolution;
   d) calculating a list of parametric mean prototype elements for the collection as a function of position by averaging all parameters except position;
   e) calculating the RMS amplitude over all possible positions of each of the parametric mean prototype elements within the baseline signal group;
   f) rescaling the coefficients derived in step (c) by the RMS baseline amplitude values;
   g) storing information sufficient to describe said sub-selected prototype elements, along with respective coefficients for each signal; and
   h) reconstructing each signal from the sum of stored prototype elements multiplied by their respective coefficients.

32. The method of claim 31, wherein the designated baseline signal group includes at least one signal from the target collection of signals to be processed.

33. A method of data compression for a sequential collection of signals, comprising the steps of
   a) storing information sufficient to reconstruct a first signal;
   b) creating a sub-collection of signals comprising at least one previously stored signal and at least one additional signal;
   c) applying either the method of claim 5 or the method of claim 9 in order to represent each signals in said sub-collection in terms of at least one prototype dictionary element;
   d) sub-selecting those prototype elements that represent differences between each additional signal and the previous signal or group of signals within the sub-collection; and
   e) storing information sufficient to describe said sub-selected prototype elements, along with respective coefficients for each additional signal in the sub-collection.

34. A method of data compression for a sequential collection of signals, comprising the steps of:
   a) parameterizing a dictionary of prototype signals in at least one variable, including at least the variable of position;
   b) storing information sufficient to reconstruct a first signal;
   c) creating a sub-collection of signals comprising at least one previously stored signal and at least one additional signal;
   d) designating a group of baseline signals;
   e) applying either the method of claim 5 or the method of claim 9 in order to represent each signal in said collection in terms of at least one prototype dictionary element;
   f) calculating a list of parametric mean prototype elements for the collection as a function of position by averaging all parameters except position;
   g) calculating the RMS amplitude over all possible positions of each of the parametric mean prototype elements within the baseline signal group;
   h) rescaling the coefficients derived in step (e) by the RMS baseline amplitude values;
   f) sub-selecting those prototype elements that represent differences between each additional signal and the previous signal or group of signals within the sub-collection; and
   i) storing information sufficient to describe said sub-selected prototype elements, along with respective coefficients for each additional signal in the sub-collection.

35. The method of claim 34, wherein the designated baseline signal group includes at least one signal from the target collection of signals to be processed.

36. A method of automatically re-aligning signals with unknown jitter variations in at least one parameter in order to compensated for said jitter, comprising the steps of:
   a) creating an aggregate collection of the signals of interest;
   b) parameterizing a dictionary of prototype signals in at least one variable, including at least those variables to be re-aligned;
   c) applying either the method of claim 5 or the method of claim 9 to represent each signal in said aggregate collection in terms of at least one prototype dictionary element;
   d) calculating a parametric mean over the signal group of interest;
   e) for each signal in the collection, correcting each jittered parameter by an amount proportionate to its mean variation from the respective group parametric mean.

37. A method of automatically generating an application-specific dictionary from a general-purpose dictionary, based upon on a collection of at least one signal, comprising the steps of
   a) applying either the method of claim 5 or the method of claim 9 in order to represent each signal in said collection in terms of at least one prototype dictionary element;
   b) applying at least one threshold to extract a subset of the resulting prototype elements derived in (a); and
   c) creating a new dictionary based on said subset of extracted prototype elements and/or combinations thereof.

38. A method of automatically generating an application-specific dictionary from a general-purpose dictionary, based upon on a collection of at least one signal, comprising the steps of:
   a) parameterizing a dictionary of prototype signals in at least one variable, including at least the variable of position;
   b) designating a group of baseline signals;
   c) applying either the method of claim 5 or the method of claim 9 in order to represent each signal in said collection in terms of at least one prototype dictionary element;
   d) calculating a list of parametric mean prototype elements for the collection as a function of position by averaging all parameters except position;
   e) calculating the RMS amplitude over all possible positions of each of the parametric mean prototype elements within the baseline signal group;
   f) rescaling the coefficients derived in step (c) by the RMS baseline amplitude values;
   g) applying at least one threshold to extract a subset of the resulting prototype elements derived in (c); and
   h) creating a new dictionary based on said subset of extracted prototype elements and/or combinations thereof.

39. The method of claim 38, wherein the designated baseline signal group includes at least one signal from the target collection of signals to be processed.

40. A method of automatically sorting novel data based upon a collection of at least one previous group of related data, comprising the steps of
   a) applying either the method of claim 5 or the method of claim 9 in order to represent each data signal in said collection in terms of at least one prototype dictionary element;
   b) applying at least one threshold to extract a subset of the prototype elements derived in (a); and
   c) determining an inner product between each novel data signal and the sub-selected prototype elements derived in (b).

41. A method of automatically sorting novel data based upon a collection of at least one previous group of related data, comprising the steps of:
   a) parameterizing a dictionary of prototype signals in at least one variable, including at least the variable of position;
   b) designating a group of baseline signals;
   c) applying either the method of claim 5 or the method of claim 9 in order to represent each signal in said collection in terms of at least one prototype dictionary element;
   d) calculating a list of parametric mean prototype elements for the collection as a function of position by averaging all parameters except position;
   e) calculating the RMS amplitude over all possible positions of each of the parametric mean prototype elements within the baseline signal group;
   f) rescaling the coefficients derived in step (c) by the RMS baseline amplitude values;
   g) applying at least one threshold to extract a subset of the prototype elements derived in (c); and
   h) determining an inner product between each novel data signal and the sub-selected prototype elements derived in step (g).

42. The method of claim 41, wherein the designated baseline signal group includes at least one signal from the collection of previous groups of related data.

* * * * *